(12) United States Patent
Hong

(10) Patent No.: US 12,241,678 B2
(45) Date of Patent: Mar. 4, 2025

(54) REFRIGERATOR

(71) Applicant: LG Electronics Inc., Seoul (KR)

(72) Inventor: Sangpyo Hong, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 18/223,705

(22) Filed: Jul. 19, 2023

(65) Prior Publication Data

US 2024/0027126 A1   Jan. 25, 2024

(30) Foreign Application Priority Data

Jul. 19, 2022   (KR) .......................... 10-2022-0088947

(51) Int. Cl.
*F25D 27/00* (2006.01)
*F21V 8/00* (2006.01)
*F25D 23/02* (2006.01)

(52) U.S. Cl.
CPC ........... *F25D 27/00* (2013.01); *F25D 23/028* (2013.01); *G02B 6/0085* (2013.01); *G02B 6/0091* (2013.01); *F25D 2323/021* (2013.01)

(58) Field of Classification Search
CPC .. F25D 27/00; F25D 23/028; F25D 2323/021; G02B 6/0085; G02B 6/0091
USPC ......................................................... 362/92
See application file for complete search history.

(56) References Cited

U.S. PATENT DOCUMENTS

2023/0152028 A1*  5/2023  Song ................... A47L 15/4265
                                                          312/405

FOREIGN PATENT DOCUMENTS

EP            4179949        5/2023
WO     WO 2022/225377       10/2022

OTHER PUBLICATIONS

Extended European Search Report in European Appln. No. 23185760.8, mailed on Jan. 3, 2024, 9 pages.

* cited by examiner

*Primary Examiner* — Laura K Tso
(74) *Attorney, Agent, or Firm* — Fish & Richardson P.C.

(57) ABSTRACT

The present disclosure relates to a refrigerator including a cabinet defining a storage space, and a door including a door body configured to open and close the storage space and a panel assembly coupled to the door body, wherein the panel assembly includes a panel defining a front surface of the door and transmitting light therethrough, a back cover defining a rear surface of the panel assembly and formed of a metal material, a light device configured to emit light to the panel, and a light supporter formed of an electrical insulation material and configured to support the lighting device, and heat generated during an operation of the lighting device is dissipated to a rear of the panel assembly through the back cover.

20 Claims, 17 Drawing Sheets

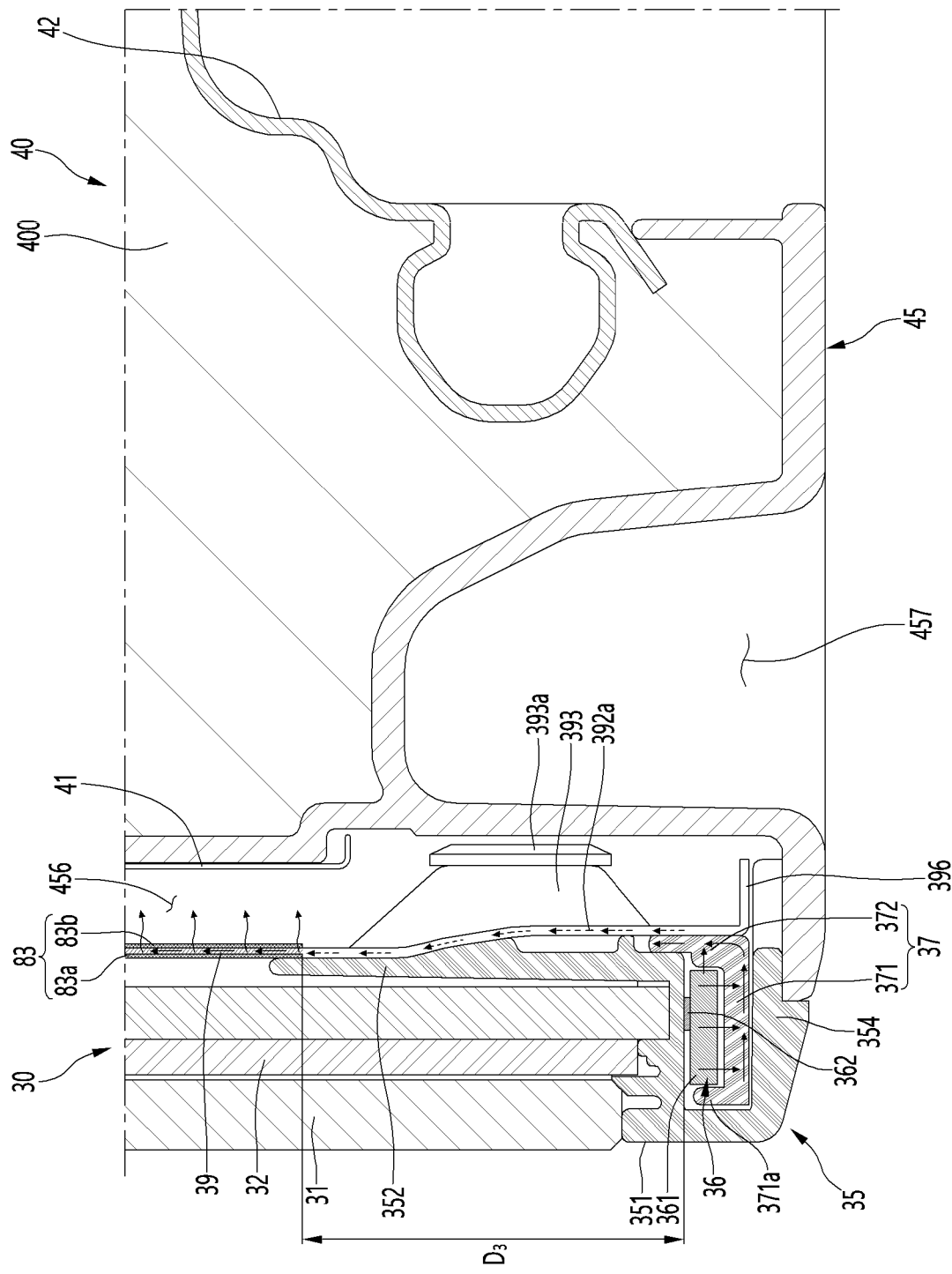

REFRIGERATOR

CROSS-REFERENCE TO RELATED APPLICATIONS

The present application claims priority under 35 U.S.C. 119 and 35 U.S.C. 365 to Korean Patent Application No. 10-2022-0088947, filed on Jul. 19, 2022, which is hereby incorporated by reference in its entirety.

BACKGROUND

The present disclosure relates to a refrigerator.

In general, refrigerators are home appliances for storing foods at low temperature in an inner storage space covered by a refrigerator door. Here, the inside of the storage space is cooled using cool air that is generated by being heat-exchanged with a refrigerant circulated in a refrigeration cycle to store the foods in an optimal state.

Such refrigerators tend to increase more and more in size and provide multi-functions due to the trends of change of dietary life and high quality, and accordingly, refrigerators provided with various structures and convenience devices in consideration of user convenience are brought to the market.

In order to harmonize with an environment in which the refrigerator is disposed or with surrounding furniture or home appliances, structures for varying an outer appearance of a door front of the refrigerator are developed, and this trend is the same throughout the home appliance.

In particular, a refrigerator in which a panel is mounted on a door defining a front appearance of the refrigerator to improve the appearance of the refrigerator has been developed.

SUMMARY

Embodiments provide a refrigerator having improved heat dissipation performance of a lighting device provided in a door.

Embodiments provide a refrigerator for preventing a front surface of a door from being overheated.

Embodiments provide a refrigerator for preventing a lighting device from being damaged due to static electricity and having improved durability.

Embodiments provide a refrigerator for maintaining the thickness of a door slim while protecting a lighting device from static electricity and having an efficient heat dissipation structure.

According to an embodiment of the present disclosure, a refrigerator includes a cabinet defining a storage space, and a door including a door body configured to open and close the storage space and a panel assembly coupled to the door body, wherein the panel assembly includes a panel defining a front surface of the door and transmitting light therethrough, a back cover defining a rear surface of the panel assembly and formed of a metal material, a light device configured to emit light to the panel, and a light supporter formed of an electrical insulation material and configured to support the lighting device, and heat generated during an operation of the lighting device is dissipated to a rear of the panel assembly through the back cover.

The light supporter may be formed of an engineering plastic material having thermal conductivity.

The light supporter may be formed of any one of a material in which a thermally conductive filler and a glass fiber (GF) are added to polyamide 6 (PA6), a material in which a mineral fiber (MF) is added to polyphenylene sulfide (PPS), a material in which carbon nanotubes (CNT) are added to polycarbonate (PC), and a material in which a mineral fiber (MF) and a glass fiber (GF) are added to polyamide 6 (PA6) or polyamide 66 (PA66).

The refrigerator may further include a heat dissipation member in contact with the light supporter and the back cover and formed of a thermally conductive material to transfer the heat generated during the operation of the lighting device to the back cover.

The light supporter may be disposed between the lighting device and the heat dissipation member and separates the lighting device and the heat dissipation member from each other.

The panel assembly may further include a bracket defining a top surface or a bottom surface of the panel assembly, and the lighting device may be provided in the bracket.

A bracket opening through which the lighting device and light supporter enter and exit may be formed on a rear surface of the bracket, and the bracket opening may be shielded by the heat dissipation member.

The lighting device may include a plurality of light emitting diodes (LEDs) that are continuously arranged on a substrate extending on a bracket, and the light supporter may include a seating portion extending along the substrate and on which the substrate is seated, and a contact portion extending from the seating portion and exposed through the bracket opening.

The substrate may be adhered to the seating portion by an adhesive member, and the adhesive member may include a thermally conductive material.

The seating portion may be formed with a recessed substrate accommodating groove for accommodating the substrate.

The contact portion may extend parallel to the back cover and may be in surface contact with the heat dissipation member.

The heat dissipation member may include a first part disposed between the seating portion and an inner surface of the bracket and in contact with the seating portion, and a second part extending from the first part and configured to shield the bracket opening, and a front surface of the second part may be in contact with the contact portion and a rear surface of the second part is in contact with the back cover.

The first part may be inserted through a decoration opening and may extend between the seating portion and the bracket.

The panel assembly may further include a light guide plate disposed behind the panel and configured to guide light emitted from the lighting device to the panel, the back cover may include a cover protrusion protruding to support the light guide plate, and a cover perimeter formed stepwise backward along a perimeter of the cover protrusion, and the second part may extend to the cover perimeter.

A handle may be recessed around the door, and the second part may extend beyond a recessed end of the handle A heat dissipation sheet formed of a thermally conductive material may be disposed between the contact portion and the back cover, and the heat dissipation sheet may further extend upward from a lower end of the back cover past an upper end of the contact portion.

The heat dissipation sheet may include a first heat dissipation sheet attached to a front surface of the back cover and in contact with the contact portion, and a second heat dissipation sheet attached to a rear surface of the back cover and exposed to a space between a front surface of the door body and the back cover.

The light supporter may be in contact with the back cover.

In a state in which the panel assembly is mounted, a heat dissipation space as a spacing may be formed between the back cover and a front surface of the door body.

The door body may include a body plate defining a front surface of the door body and disposed to face the back cover in a spaced apart state from the back cover, a door liner defining a rear surface of the door, an upper cap decoration defining an upper surface of the door body, and a lower cap decoration defining a bottom surface of the door body, and a foaming liquid may be injected into a space formed by coupling the body plate, the door liner, the upper cap decoration, and the lower cap decoration to form an insulator.

A refrigerator according to a proposed embodiment may expect the following effects.

In the refrigerator according to an embodiment of the present disclosure, heat generated during an operation of a lighting device may be effectively dissipated through a back cover to improve heat dissipation performance.

Heat generated from the lighting device may be discharged more through a rear surface of a panel assembly than through front and bottom surfaces of a door. Accordingly, it is possible to prevent an excessive increase in temperature of a front surface of the door accessible to a user or a lower surface where a handle is formed.

In particular, even if the lighting device is kept turned on for a long time, heat generated from the lighting device is dissipated through a heat dissipation member and a back cover, and thus the temperature of the lighting device is not excessively increased. Therefore, an effect of preventing the lighting device from being damaged by high temperature and improving durability may be expected.

The back cover may be spaced apart from a front surface of a door body to form a heat dissipation space, and heat of the back cover may be discharged to a heat dissipation space to further improve heat dissipation performance of the lighting device.

A light supporter supporting the lighting device may be formed of an electrical insulating material. That is, even if static electricity is generated during manipulation of the door, it is possible to prevent static electricity from being transferred to the lighting device by the light supporter. Therefore, there is an advantage of preventing the lighting device from being damaged by static electricity and maintaining durability.

The light supporter may be in contact with the heat dissipation member, and heat generated from the lighting device may be transferred to the back cover through the light supporter and the heat dissipation member. Therefore, there is an advantage in ensuring heat dissipation performance of the lighting device while electrically insulating and protecting the lighting device.

The lighting device is electrically insulated while seated on the light supporter, and the light supporter may have a structure in which heat is dissipated to a heat dissipation space at the rear in contact with the back cover by a heat dissipation member. Accordingly, there is an advantage in preventing an increase in the thickness of the door by enabling both electrical insulation and heat dissipation while maintaining a slim overall thickness of the panel assembly.

BRIEF DESCRIPTION OF THE DRAWINGS

FIG. 17 is a cross-sectional view taken along XVII-XVII' of FIG. 16.

DETAILED DESCRIPTION OF THE EMBODIMENTS

Hereinafter, detailed embodiments will be described in detail with reference to the accompanying drawings. However, the present disclosure is limited to the embodiments in which the spirit of the present disclosure is proposed, and other degenerate idea or other embodiments included in the scope of the present disclosure may be easily proposed by addition, changes, deletions, etc. of other elements.

Prior to a description, directions are defined. In an embodiment of the present disclosure, a direction toward a door is defined as a front direction with respect to a cabinet shown in FIGS. 2 and 2, a direction toward the cabinet with respect to the door is defined as a rear direction, a direction toward a bottom on which a refrigerator is installed is defined as a downward direction, and a direction away from the bottom is defined as an upward direction.

Figure 1:
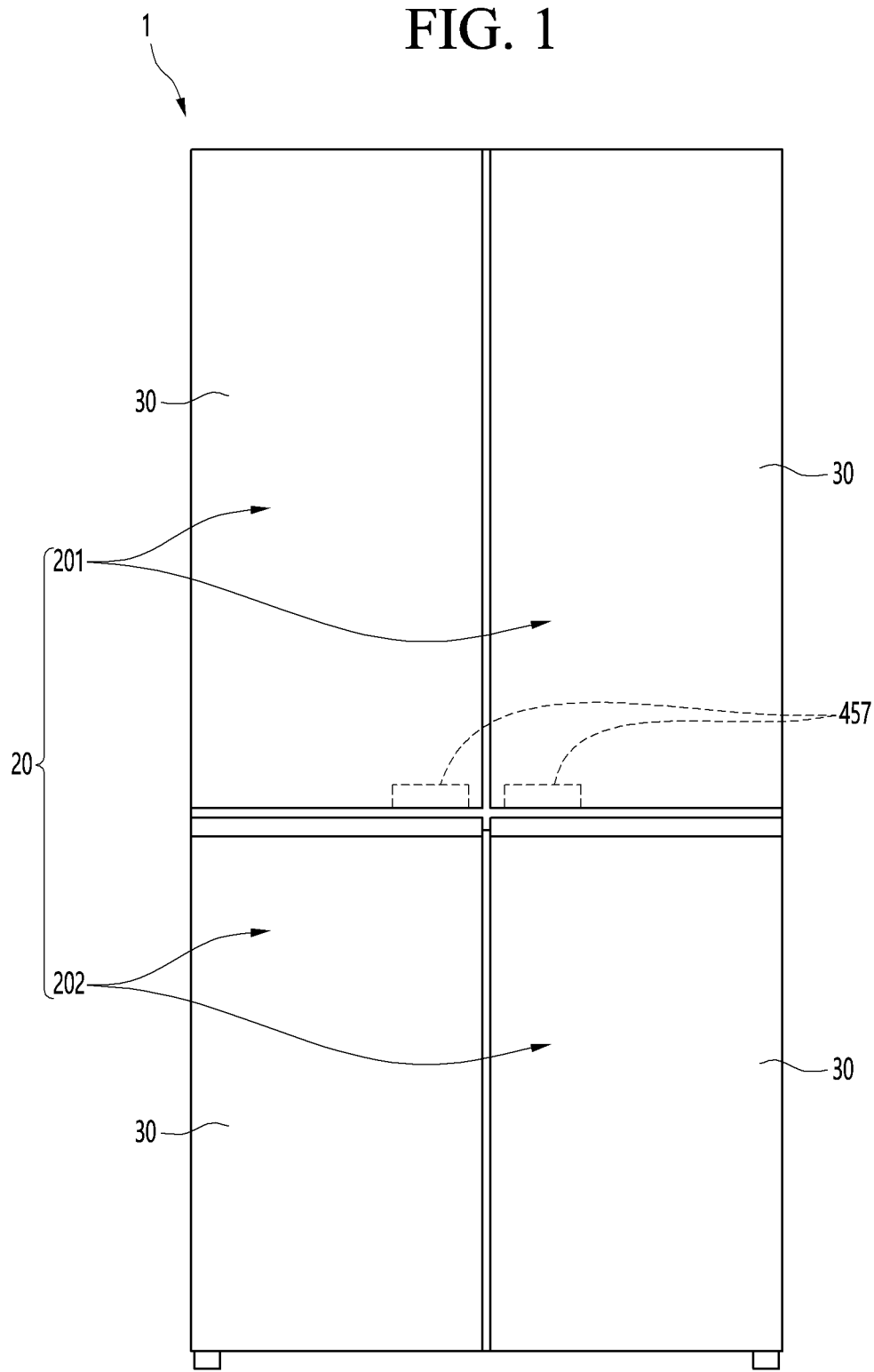
FIG. 1 is a front view of a refrigerator according to a first embodiment.
Figure 2:
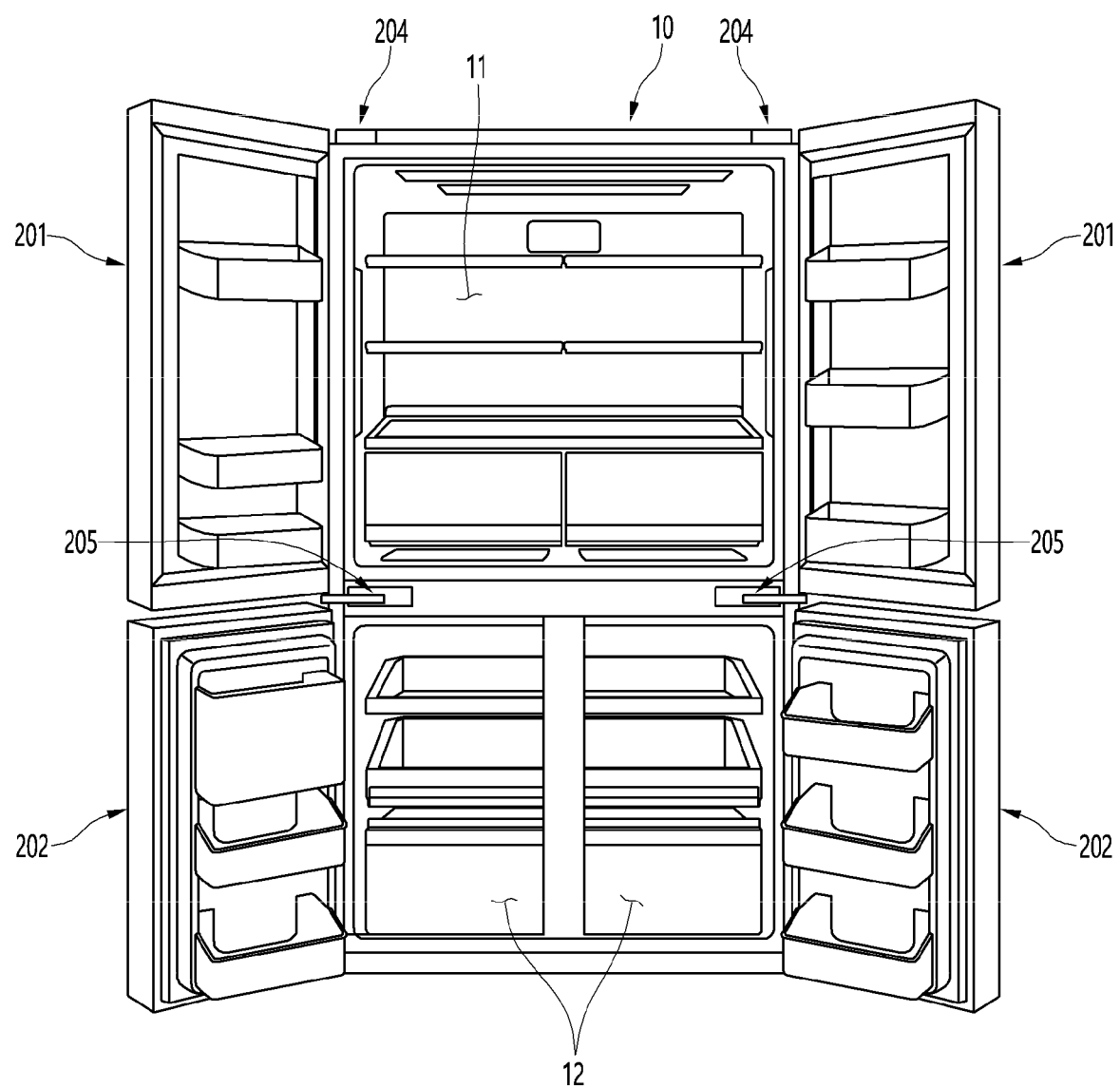
FIG. 2 is a front view illustrating a state in which a door of the refrigerator is opened.

FIG. 1 is a front view of a refrigerator according to an embodiment. FIG. 2 is a front view illustrating a state in which a door of the refrigerator is opened.

As illustrated in the drawings, an outer appearance of a refrigerator 1 according to an embodiment may be defined by a cabinet 10 in which a storage space is defined, and a door 20 for opening and closing the storage space of the cabinet 10.

For example, the cabinet 10 may define the storage space partitioned in a vertical direction. Here, a refrigerating compartment 11 may be defined at an upper portion of the cabinet 10, and a freezing compartment 12 may be defined at a lower portion of the cabinet 10. The refrigerating compartment 11 may be referred to as an upper storage space, and the freezing compartment 12 may be referred to as a lower storage space.

The door 20 may be configured to open and close each of the refrigerating compartment 11 and the freezing compartment 12. For example, the door 20 may be rotatably mounted to the cabinet 10 by being connected by hinge devices 204 and 205, and each of the refrigerating compartment 11 and the freezing compartment 12 may be opened and closed by the rotation.

The door 20 may include a refrigerating compartment door 201 that opens and closes the refrigerating compartment 11 and a freezing compartment door 202 that opens and closes the freezing compartment 12. In addition, a pair of the refrigerating compartment door 201 and the freezing compartment door 202 may be arranged side by side at both left and right sides. The refrigerating compartment door 201 may be referred to as an upper door, and freezing compartment door 202 may be referred to as a lower door.

A handle 457 may be disposed on each of the refrigerating compartment door 201 and the freezing compartment door 202. The user may open and close the refrigerator compartment door 201 and the freezer compartment door 202 by holding the handle 457.

An outer appearance of a front surface of the refrigerator 1 may be defined in the state in which the door 20 is closed and may define the outer appearance of the refrigerator 1 viewed from the front in the state in which the refrigerator 1 is installed. In addition, at least a portion of the front surface of the door 20 may be configured to shine in a color set by an operation of the lighting device 36.

In the present embodiment, for convenience of description and understanding, although a refrigerator having a structure in which the refrigerating compartment 11 is disposed above and the freezing compartment 12 is disposed below, and the door 20 opened and closed by rotation is described as an example, the present disclosure may be applied to all types of refrigerators equipped with doors without being limited to the opening and closing forms of refrigerators and doors. That is, the door 20 may be a sliding door.

Hereinafter, the structure of the door 20 will be described in detail with reference to drawings. In addition, in an embodiment of the present disclosure will be described with reference to the refrigerator compartment door 201 disposed at the left side, and for convenience of description, the refrigerating compartment door 201 may be referred to as the door 20.

Figure 3:
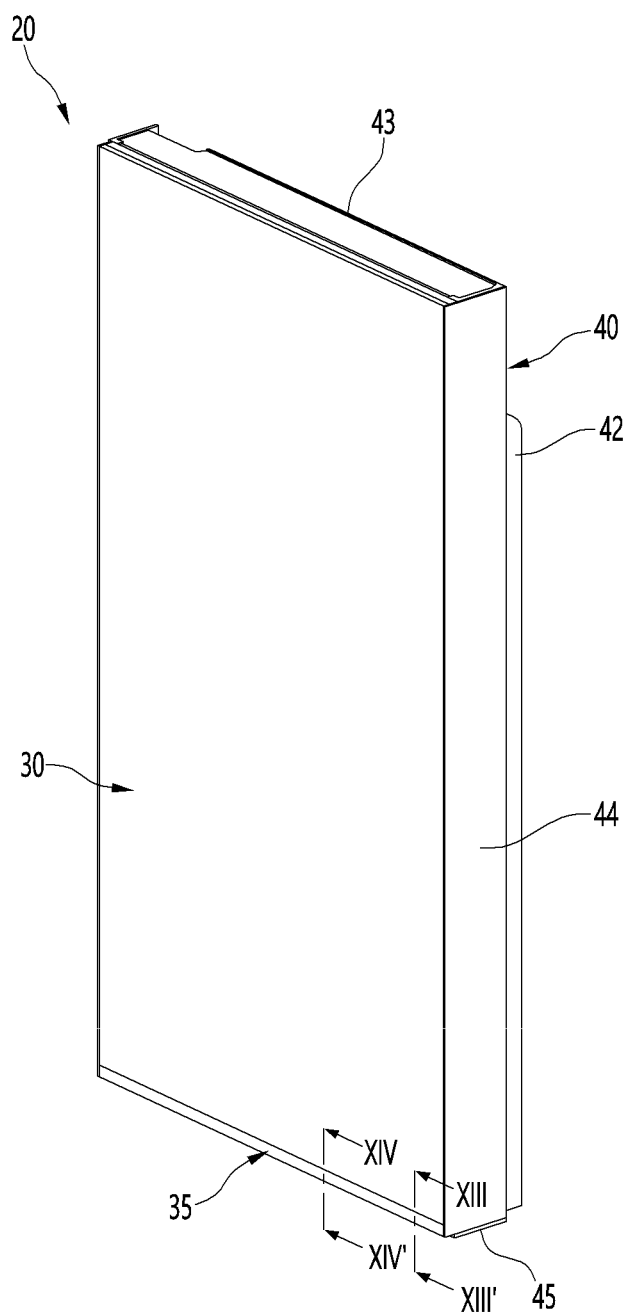
FIG. 3 is a perspective view of the door.
Figure 4:
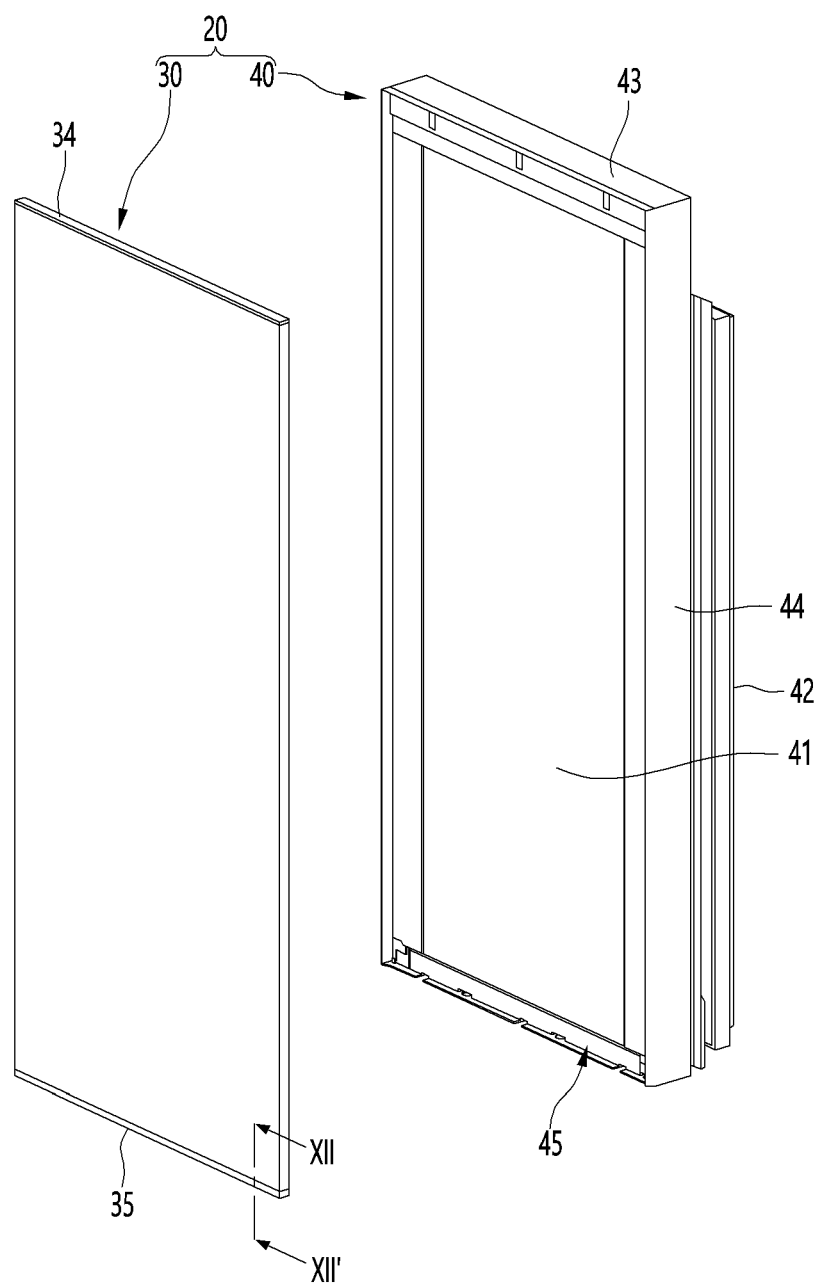
FIG. 4 is an exploded perspective view in which a panel assembly and a door body as components of the door are disassembled.

FIG. 3 is a perspective view of the door. FIG. 4 is an exploded perspective view in which a panel assembly and a door body as components of the door are disassembled.

As illustrated in the drawings, the door 20 may include a door body 40 defining the overall shape of the door 20 and configured to open and close the storage space and a panel assembly defining an outer appearance of a front surface of the door 20. The door 20 may be configured such that the panel assembly 30 is mounted on a front surface of the door body 40.

The door body 40 may include a body plate 41 defining a front surface and a door liner 42 defining a rear surface. The body plate 41 may be made of a metal material and disposed to face a rear surface of the panel assembly 30.

The door body 40 may include a side decoration 44 defining right and left side surfaces of the door body 40. The side decoration 44 may connect right and left side ends of the body plate 41 and right and left side ends of the door liner 42.

The door body 40 may include an upper cap decoration 43 and a lower cap decoration that form top and bottom surfaces of the door body 40. The upper cap decoration 43 may be connected to an upper end of the side decoration 44, an upper end of the body plate 41, and an upper end of the door liner 42. The lower cap decoration 45 may be connected to a lower end of the side decoration 44, a lower end of the body plate 41, and a lower end of the door liner 42. In addition, the insulator 400 may be filled inside the door body 40.

The panel assembly 30 may be provided in a plate shape and may define an outer appearance of the front surface of the door 20 while being mounted on the front surface of the door body 40. The panel assembly 30 may be referred to as a door panel or an exterior panel.

The panel assembly 30 may be detachably mounted to the door body 40 in an assembled state. Upper and lower ends of the panel assembly 30 may be fixed to the upper cap decoration 43 and the lower cap decoration 45. A heat dissipation space 456 that is a spacing may be formed between the front surface of the door body 40 and the rear surface of the panel assembly 30.

Hereinafter, the panel assembly 30 will be described in more detail with reference to drawings.

Figure 5:
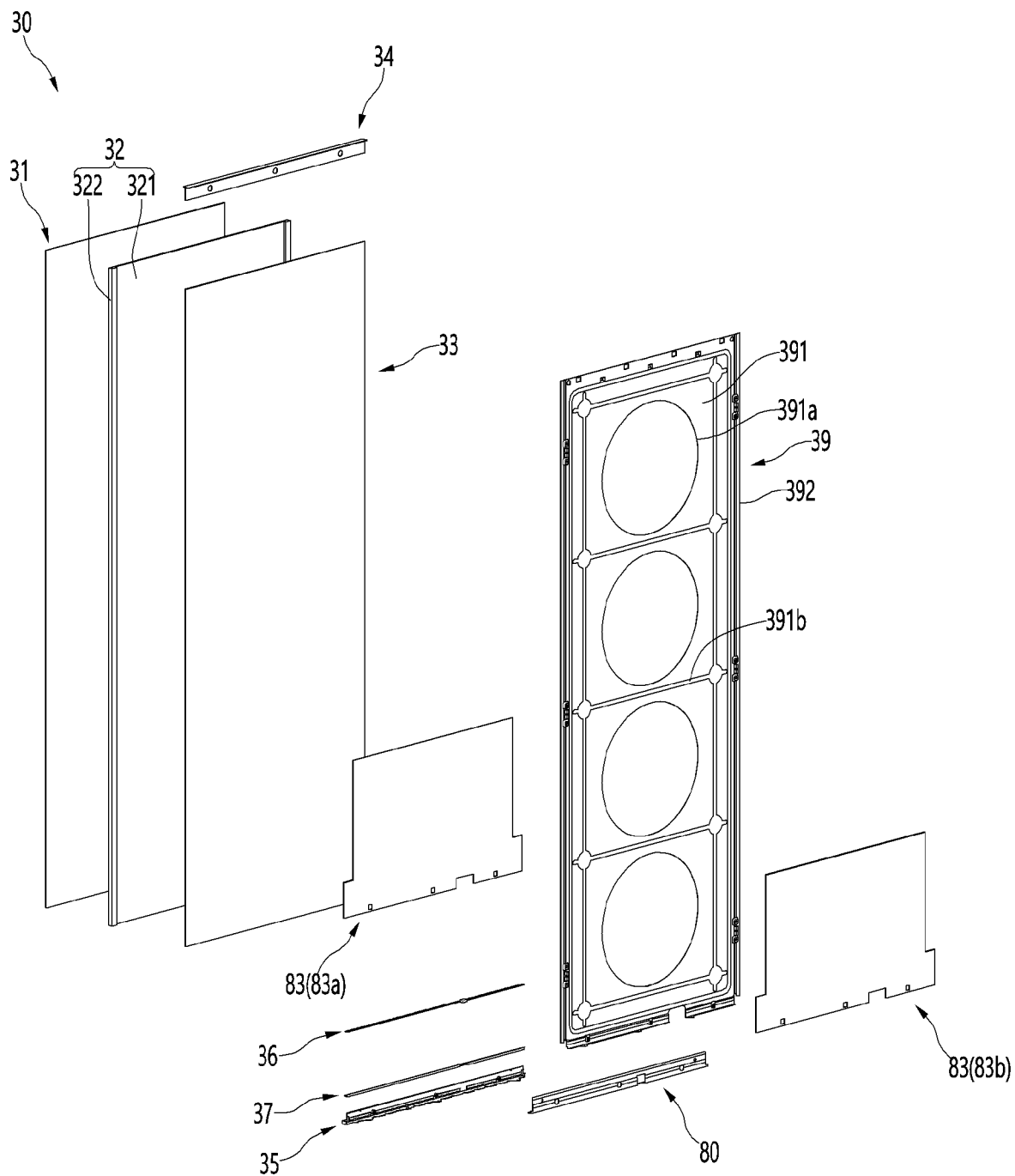
FIG. 5 is an exploded perspective view of the panel assembly.
Figure 6:
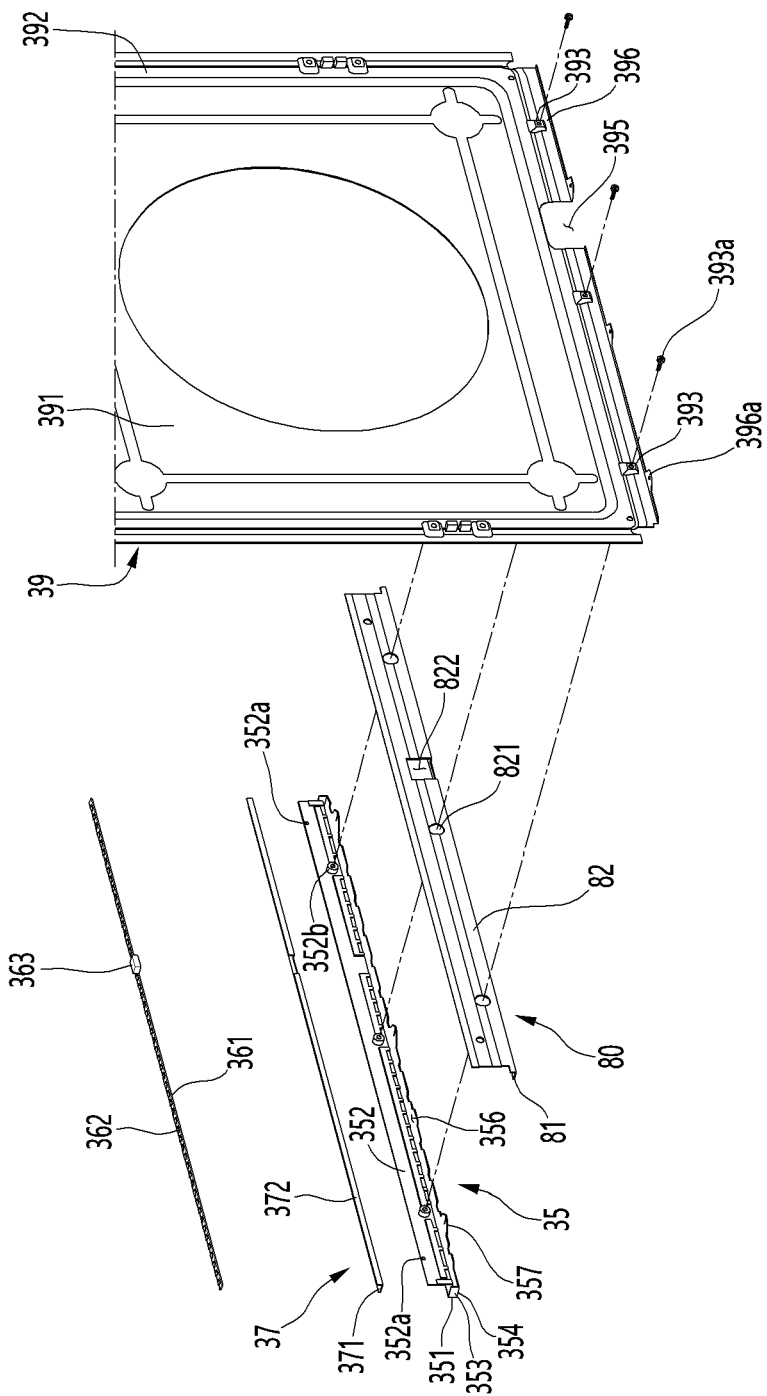
FIG. 6 is an exploded perspective view showing a coupling structure of a lighting device, a light supporter, a lower bracket, a heat dissipation member, and a back cover as components of the panel assembly.

FIG. 5 is an exploded perspective view of the panel assembly. FIG. 6 is an exploded perspective view showing a coupling structure of a lighting device, a light supporter, a lower bracket, a heat dissipation member, and a back cover as components of the panel assembly.

As shown in the drawings, the panel assembly 30 may include a panel 31 defining an outer appearance of a front surface thereof, a lighting device 36 emitting light to the panel 31, and a back cover 39 defining a rear surface of the panel assembly 30.

The panel assembly 30 may further include a light supporter 37 supporting the lighting device 36. The panel assembly 30 may include a heat dissipation member 80 that dissipates heat transferred from the lighting device 36, through the back cover 39.

The panel assembly 30 may include a light guide plate 33 that guides light of the lighting device 36 to the panel 31. The panel assembly 30 may further include a mounting member 32 that mounts the light guide plate 33 and the panel 31.

The panel assembly 30 may include an upper bracket 34 defining a top surface of the panel assembly 30 and a lower bracket 35 defining a bottom surface of the panel assembly 30. The lighting device 36 may be mounted on the lower bracket 35.

In more detail, the panel 31 may be formed in a rectangular plate shape and may be formed of a material that transmits light therethrough. In addition, the panel 31 may be mounted on the mounting member 32.

The light guide plate 33 may be disposed at a rear side spaced apart from the panel 31. In addition, the light guide plate 33 may be configured to guide emitted from the lighting device 36 disposed below the light guide plate 33 toward the panel 31. A reflective layer 331 that reflects the light forward may be provided on a rear surface of the light guide plate 33.

The mounting member 32 may be configured such that the light guide plate 33 and the panel 31 are fixedly mounted thereon. The mounting member 32 may include a front surface portion 321, on which the panel 31 is mounted, and a side surface portion 322 protruding backward from each of both left and right ends of the front surface portion 321.

Both ends of the light guide plate 33 may be inserted and fixed to the side surface portions 322 on both the left and right sides, respectively. In addition, the upper bracket 34 and the lower bracket 35 may be inserted and fixed to upper and lower ends of the side surface portion, respectively. In addition, both left and right ends of the back cover 39 may be supported by the side surface portion 322.

The mounting member 32 may not be limited to such a structure, but may have a variety of different structures to be coupled to at least one of the panel 31, the light guide plate 33, the upper bracket 34, the lower bracket 35, or the back cover 39.

The panel assembly 30 may also be configured by coupling the panel 31, the light guide plate 33, the upper bracket 34, the lower bracket 35, and the back cover 39 without the mounting member 32.

The lower bracket 35 may include a lower bracket front surface portion 351, a lower bracket rear surface portion 352, a lower bracket side surface portion 353, and a lower bracket bottom surface portion 354. A space in which the lighting device 36 is accommodated may be defined in the lower bracket by the lower bracket front surface portion 351, the lower bracket rear surface portion 352, and the lower bracket side surface portion 353.

A bracket opening 356 may be defined in the lower bracket rear surface portion 352. The lighting device 36 may be accessible through the bracket opening 356. In addition, the bracket opening 356 may be shielded by the back cover 39.

The lower bracket rear surface portion 352 may extend upward. In addition, left and right ends of the lower bracket rear surface portion 352 may be inserted through an open bottom surface of the side surface portion 322 and coupled to the mounting member 32.

A bracket fastening part 352b to which a screw 393a is fastened may be formed on the lower bracket rear surface portion 352. A plurality of bracket fastening parts may be provided and may extend along the lower bracket rear surface portion 352. The screw 393a may be fastened to the bracket fastening part 352b, and the back cover 39 may be fixedly mounted by fastening the screw 393a. A bracket fixing end 357 extending rearward may be formed at a rear end of the lower bracket bottom surface portion 354.

Guide protrusions 352a may be formed on both sides of the lower bracket rear surface portion 352. The guide protrusions 352a may protrude rearward. In addition, the guide protrusions 352a may be combined with the heat dissipation member 80 and the back cover 39 to guide the components constituting the panel assembly 30 to be aligned in an accurate position.

The lighting device 36 may be provided inside the lower bracket 35. The lighting device 36 is disposed below the light guide plate 33 and may extend along a lower end of the light guide plate 33.

In detail, the lighting device 36 may include a substrate 361 and a light source 362. The substrate 361 may extend along the lower bracket 35. In addition, a plurality of the light sources 362 may be continuously arranged at regular intervals along the substrate 361 and may emit light toward a lower end of the light guide plate 33. The light source 362 may include, for example, an RGB LED. Thus, the lighting device 36 may emit light of a set color, and the front surface of the door may shine in various colors.

In the embodiment of the present disclosure, although an example in which the lighting device 36 is provided at a lower end of the door 20, that is, the lower bracket 35 is described, the lighting device 36 may be disposed on at least one side of a perimeter of the door 20 from which light is to be emitted to an end of the light guide plate 33. That is, the lighting device 36 may be provided in the upper bracket 34. As another example, the lighting device 36 may be provided on the mounting member 32. According to placement of the mounting member 32, the light supporter 37 and the heat dissipation member 80 may be positioned at corresponding positions.

The light supporter 37 may be provided below the substrate 361. The light supporter 37 may support the lighting device 36 such that the lighting device 36 is fixedly mounted inside the lower bracket 35. In addition, the light supporter 37 may separate the lighting device 36 from the back cover 39 and the heat dissipation member 80 made of metal and electrically insulate the lighting device 36. Therefore, penetration of static electricity into the lighting device 36 may be prevented.

Hereinafter, the light supporter 37 will be described in more detail with reference to drawings.

Figure 7:
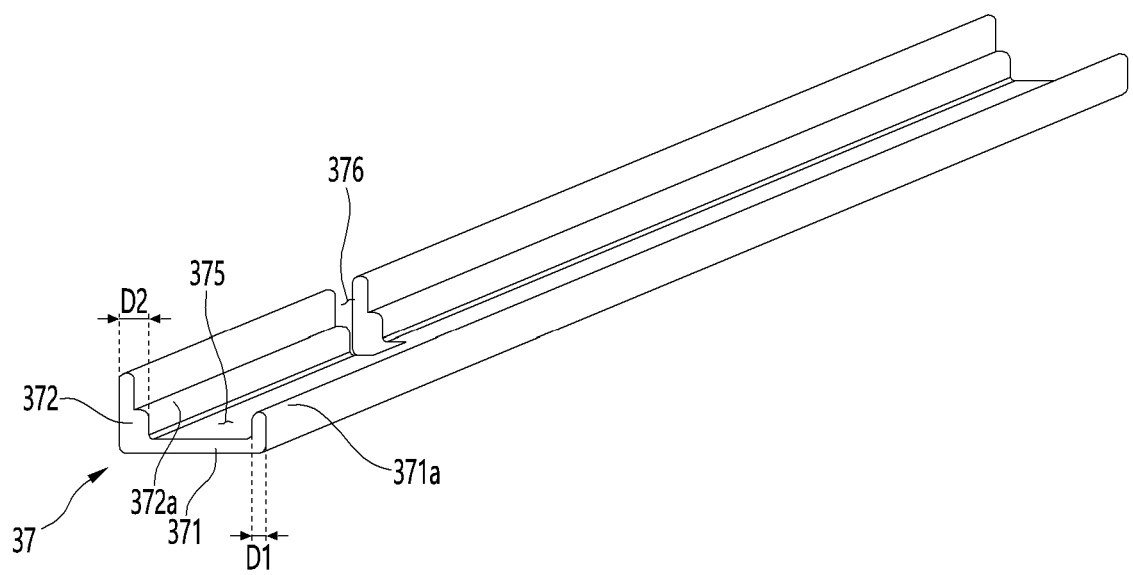
FIG. 7 is a perspective view of the light supporter.

FIG. 7 is a perspective view of the light supporter.

As shown in the drawing, the light supporter 37 may extend to both left and right sides based on the front surface of the door 20. The light supporter 37 may have a length corresponding to that of the lighting device 36. The light supporter 37 may be formed of an electrical insulating material, and may block static electricity from being transferred to the lighting device 36.

The light supporter 37 may be formed of a plastic material. The light supporter 37 may be formed to transfer heat from the lighting device 36 to the heat dissipation member 80 while maintaining an electrically insulated state. That is, the light supporter 37 may be formed of a material that is electrically insulated but capable of transmitting heat, and may be formed of an engineering plastic material that satisfies these characteristics.

For example, the light supporter 37 may be formed of a material in which polyamide 6 (PA6) is used as a main resin and a thermally conductive filler and a glass fiber (GF) are added. In addition, the light supporter may be formed of a material in which polyphenylene sulfide (PPS) is used as a main resin and a mineral fiber (MF) is added. In addition, the light supporter may be formed of a material in which polycarbonate (PC) is used as a main resin and carbon nanotubes (CNT) are added. Further, the light supporter may be formed of a material in which polyamide 6 (PA6) or polyamide 66 (PA66) is used as a main resin and a mineral fiber (MF) and a glass fiber (GF) are added.

Needless to say, the light supporter 37 may be of various other combinations for blocking electrical conduction and transmitting heat among the above-mentioned materials. At this time, the meaning of electrical insulation or blocking of electrical conduction of the light supporter 37 may be understood as blocking application of a voltage that causes an abnormality to the lighting device 36.

The light supporter 37 may support the lighting device 36 to maintain the lighting device 36 in an accurate position. The light supporter 37 may extend left and right with respect to the front surface of the panel 31. In addition, the light supporter 37 may be formed to have the same cross-sectional structure in an extending direction. Accordingly, the light supporter 37 may be injection or extrusion molded.

The light supporter 37 may support the lighting device 36 and may be fixed inside the lower bracket 35. The light supporter 37 may include a seating portion 371 and a contact portion 372.

The seating portion 371 may define a bottom surface of the light supporter 37 and may be disposed below the substrate 361 to support the substrate 361. In addition, the substrate 361 may be adhered to the seating portion 371 by an adhesive member 373. In this case, the adhesive member 373 may be made of a thermally conductive material. The seating portion 371 may be maintained in a state of being in contact with the substrate 361 and heat generated from the substrate 361 may be transferred to the seating portion 371.

A front protrusion 371a protruding upward may be formed at a front end of the seating portion 371. The front protrusion 371a may contact the front end of the substrate 361. In addition, the front protrusion 371a extends upward more than the substrate 361 to restrain forward movement of the substrate 361.

The contact portion 372 may extend upward from the rear end of the seating portion 371. The contact portion 372 may be exposed to the rear through the bracket opening 356 in a state of being mounted on the lower bracket 35. The contact portion 372 may shield the bracket opening 356. Thus, when the heat dissipation member 80 is mounted, the rear surface of the contact portion 372 may come into contact with the front surface of the heat dissipation member 80.

The contact portion 372 may include a rear protrusion 372a. The rear protrusion 372a protrudes from the rear of the front protrusion 371a and may contact the rear end of the substrate 361. The rear protrusion 372a extends upward more than the substrate 361 to restrict backward movement of the substrate 361.

The front protrusion 371a and the rear protrusion 372a may extend along the seating portion 371. The front protrusion 371a and the rear protrusion 372a may protrude at the same height. A substrate accommodating groove 375 into which the substrate 361 is inserted may be formed between the front protrusion 371a and the rear protrusion 372a. Accordingly, the substrate 361 may be fixed while being accommodated inside the substrate receiving groove 375.

Accordingly, the substrate 361 may be completely separated from the heat dissipation member 80 by the light supporter 37. In addition, the substrate 361 may be completely separated without contacting the back cover 39 by the light supporter 37. That is, the substrate 361 may be separated from the heat dissipation member 80 and the back cover 39 made of metal by the light supporter 37. Therefore, the lighting device 36 may be electrically insulated by blocking inflow of static electricity.

Based on the substrate 361, a thickness D1 of a front end of the light supporter 37 may be smaller than a thickness D1 of a rear end of the light supporter 37. The rear end of the light supporter 37 may extend more upward than the front end of the light supporter 37. In detail, the thickness D1 of the front protrusion 371a may be formed thinner than the thickness D2 of the contact portion 372. The contact portion 372 may extend upward more than the front protrusion 371a.

Accordingly, the heat generated in the lighting device 36 may be induced to move toward the rear of the light supporter 37 having a relatively thick thickness and extending upward to have a greater heat capacity than the lighting device 36. That is, the light supporter 37 may guide the heat generated by the lighting device 36 toward the rear rather than the front, and direct the heat to the heat dissipation member 80 and the back cover 39.

A supporter cutout 376 may be formed on a rear surface of the light supporter 37, that is, on one side of the contact portion 372. The supporter cutout 376 may be formed at a position corresponding to the connector 363 of the substrate 361. In a state in which the substrate 361 is seated on the seating portion 371, the connector 363 of the substrate 361 may protrude backward through the supporter cutout 376.

In a state in which the lighting device 36 and the light supporter 37 are mounted inside the lower bracket 35, the light supporter 37 comes into contact with the heat dissipation member 80.

Hereinafter, the structure of the heat dissipation member 80 will be examined in more detail with reference to the drawings.

Figure 8:
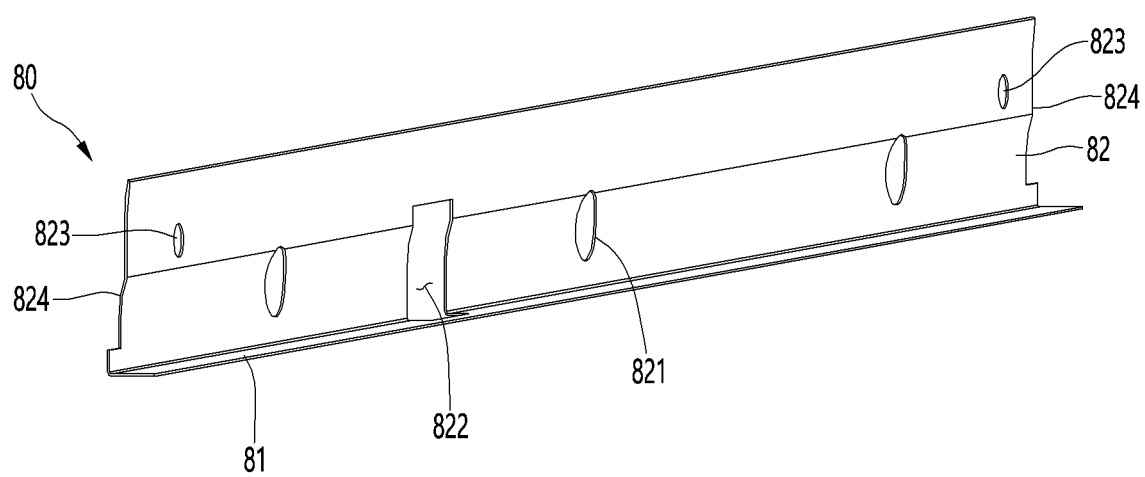
FIG. 8 is a perspective view of the heat dissipation member.

FIG. 8 is a perspective view of the heat dissipation member.

As shown in the drawing, the heat dissipation member 80 may be formed by bending a plate-shaped metal material. For example, the heat dissipation member 80 may be formed of an aluminum material having excellent thermal conductivity.

The heat dissipation member 80 may be formed with a length corresponding to that of the lighting device 36 or the light supporter 37. The heat dissipation member 80 may be mounted on the lower bracket 35. Needless to say, when the lighting device 36 and the light supporter 37 are mounted on the upper bracket 34, the heat dissipation member 80 may also be mounted on the upper bracket 34.

The heat dissipation member 80 may include a first part 81 and a second part 82. The first part 81 defines a bottom surface of the heat dissipation member 80 and may extend to the front of the second part 82. The first part 81 may be inserted through the bracket opening 356 and come into contact with the bottom surface of the seating portion 371.

The first part 81 may extend from the bracket opening 356 to a front end of the seating portion 371. The first part 81 may completely shield the bottom surface of the seating portion 371. Accordingly, the first part 81 may separate the seating portion 371 from the bottom surface of the lower bracket 35. That is, the top surface of the first part 81 may contact the seating portion 371 and the bottom surface of the first part 81 may contact the bottom surface of the lower bracket 35.

The second part 82 may extend upward from the rear end of the first part 81. The second part 82 may be bent vertically at an end of the first part 81. The second part 82 may shield the bracket opening 356. The second part 82 may come into close contact with the contact portion 372 exposed through the bracket opening 356.

Accordingly, the first part 81 and the second part 82 may come into contact with the seating portion 371 and the contact portion 372, respectively, and thus heat transmitted through the light supporter 37 may be completely transferred to the back cover 39.

The second part 82 may extend upward along the lower bracket rear surface portion 352 and the back cover 39. The shape of the second part 82 is formed to correspond to a concavo-convex shape of the back cover 39 to be adhered to the back cover 39.

The second part 82 may be located on a cover perimeter portion 392 of the back cover 39. The extended end of the second part 82 is located in a region of the cover perimeter portion 392 and may not extend to the cover protrusion 391. Accordingly, the second part 82 extends to the maximum height within a range in which the second part 82 does not interfere with the cover protrusion 391 to ensure heat dissipation performance.

A screw hole 821 through which the screw 393a fastened to mount the back cover 39 may be further formed in the second part 82. The screw hole 821 may be opened at a position corresponding to a position to which the screw 393a is fastened. The screw hole 821 may be formed in a size that does not interfere with the bracket fastening part 352*b* of the lower bracket 35 and the cover fastening part 393 of the back cover 39.

In addition, a heat dissipation member cutout 822 may be further formed in the second part 82. The heat dissipation member cutout 822 may be formed to allow a wire or connector 363 connected to the substrate connector 363 to enter or exit. The heat dissipation member cutout 822 may be formed at a position corresponding to the substrate connector 363 and the cover cutout 395. The heat dissipation member cutout 822 may be formed in the same shape as the cover cutout 395.

Guide holes 823 may be formed on both sides of the second part 82. The guide hole 823 may be formed at a position corresponding to the guide protrusions 352*a* of the lower bracket 35 and may be formed to pass the guide protrusions 352*a*. Positions of the lower bracket 35 and the heat dissipation member 80 may be aligned by a combination of the guide protrusions 352*a* and the guide hole 823.

In addition, side cutouts 824 stepped inward may be formed at both left and right ends of the second part 82. The side cutout 824 may be cut not to interfere with the side surface portion 322 of the mounting member 32 when the heat dissipation member 80 is mounted.

The upper bracket 34 and the lower bracket 35 are mounted on the mounting member 32, and the back cover 39 is coupled in a state where the heat dissipation member 80 is mounted, thereby completing assembly of the panel assembly 30.

Hereinafter, the back cover 39 will be described in more detail with reference to drawings.

Figure 9:
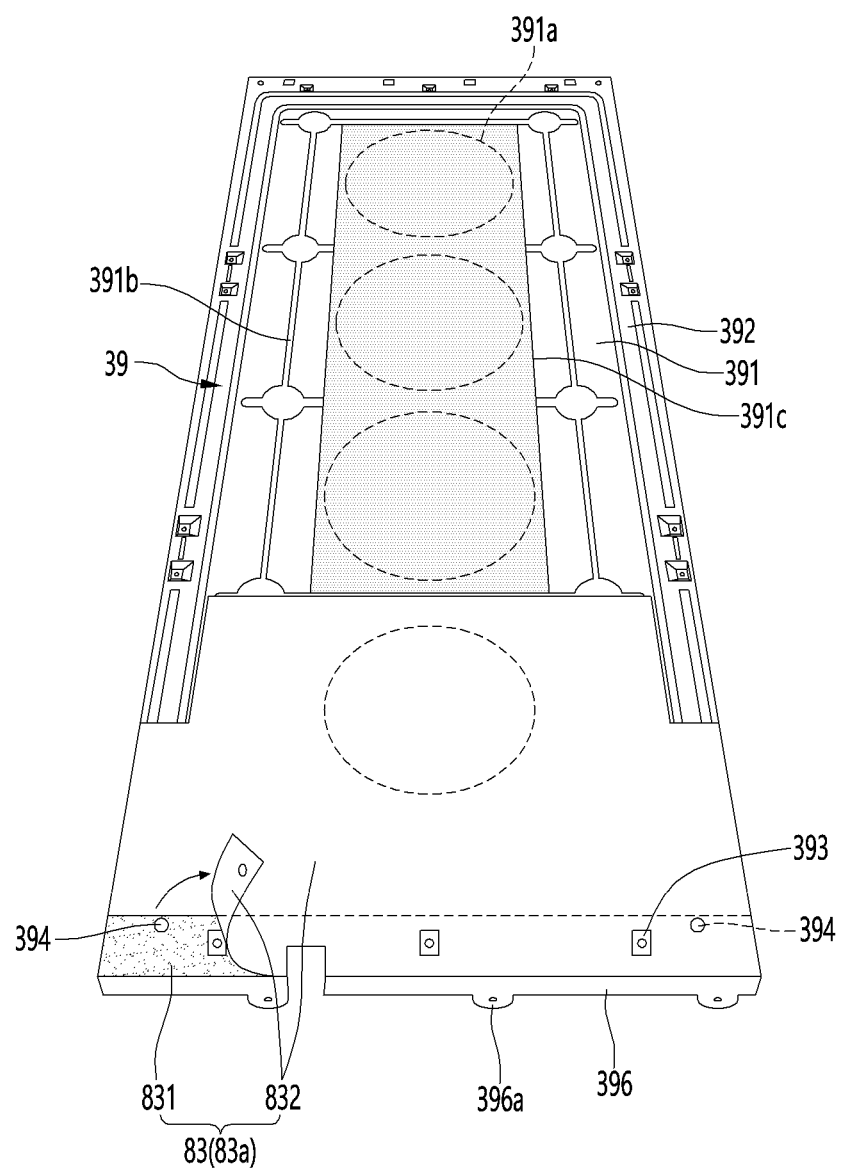
FIG. 9 is a perspective view of the back cover when viewed from the front.
Figure 10:
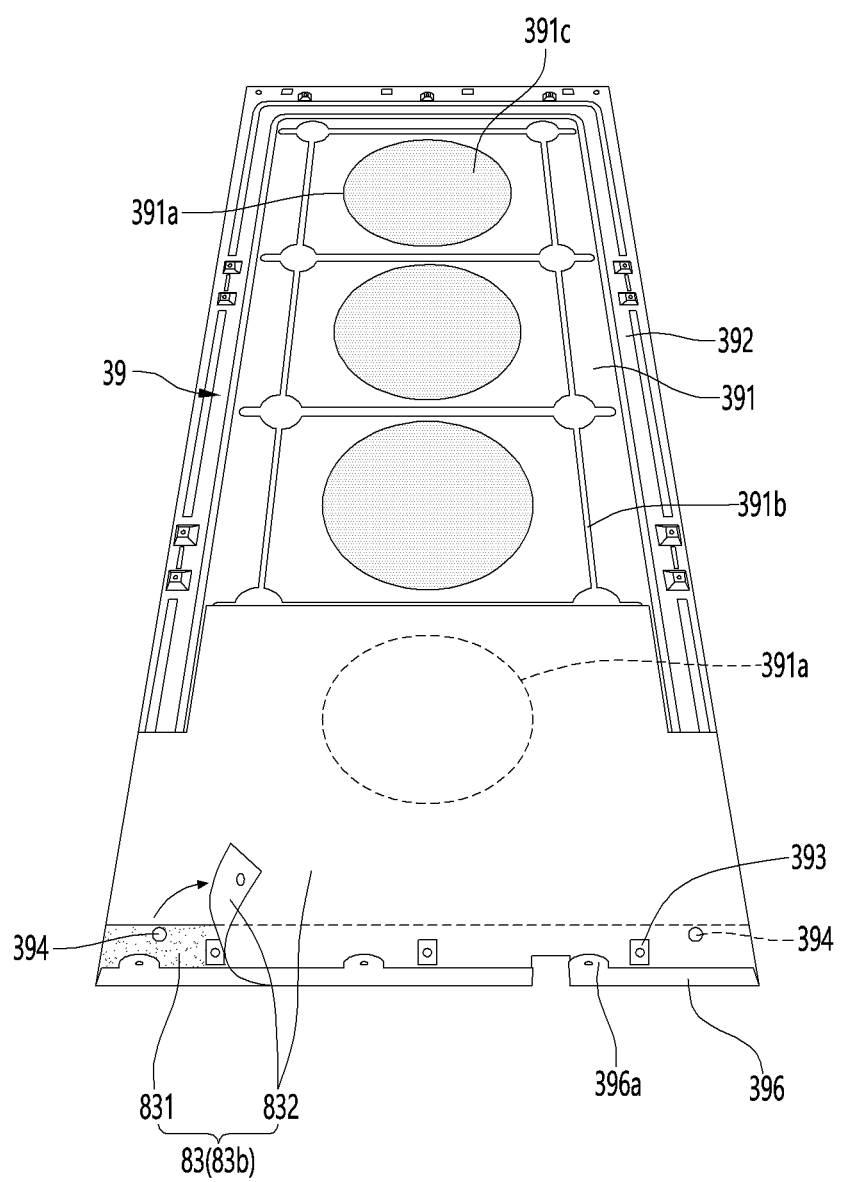
FIG. 10 is a perspective view of the back cover when viewed from the rear.

FIG. 9 is a perspective view of the back cover when viewed from the front. FIG. 10 is a perspective view of the back cover when viewed from the rear.

As shown in the drawing, the back cover 39 may be provided in a shape of a plate made of a metal material having excellent thermal conductivity and high strength. For example, the back cover 39 may be made of a galvanized steel sheet. The back cover 39 may include a cover protrusion 391 at a center of the back cover 39 and a cover perimeter portion 392 at an edge of the cover protrusion 391. In the back cover 39, the cover protrusion 391 and the cover perimeter portion 392 may be formed by a forming process.

The cover protrusion 391 may protrude further forward than the cover perimeter portion 392 and may support the light guide plate 33 at the rear side. In addition, a reinforcement 391*b* for preventing deformation of the back cover 39 may be formed in the cover protrusion 391. For example, the reinforcement 391*b* may be formed by forming a lattice crossing in horizontal and vertical directions. The reinforcement 391*b* may be formed during the forming process of the back cover 39, and may be protruded or recessed.

A cover opening 391*a* may be formed in the cover protrusion 391. The plurality of cover openings 391*a* may be formed vertically along the center of the cover protrusion 391. The cover opening 391*a* is formed in a set size and number to reduce the overall weight of the back cover 39. In addition, a cover sheet 391*c* may be attached to the front surface of the cover protrusion 391. The cover sheet 391*c* may block inflow of dust or foreign substances through the cover opening 391*a*.

The cover perimeter portion 392 may be formed of a remaining portion of the back cover 39 excluding the cover protrusion 391 at the center of the back cover 39. The cover perimeter portion 392 may be formed to an outer end of the back cover 39 from the cover protrusion 391. The cover perimeter portion 392 may be positioned rearward with respect to the cover protrusion 391. The upper and lower cover perimeter portions 392 of the cover perimeter portion 392 may be coupled to the upper bracket 34 and the lower bracket 35. The cover perimeter portion 392 on both left and right sides of the cover perimeter portion 392 may be supported by a side surface portions 322 of the mounting member 32.

A cover bent portion 396 bent backward may be formed at a lower end of the back cover 39. A cover fixing end 396*a* overlapping the bracket fixing end 357 may be formed on the cover bent portion 396. A screw passing through the cover fixing end 396*a* and the bracket fixing end 357 may be fastened such that a lower end of the panel assembly 30 is fixedly mounted to the lower cap decoration 45.

A cover cutout 395 through which the connector 363 of the substrate 361 is exposed may be formed at a lower end of the back cover 39. Accordingly, when the panel assembly 30 is mounted to the door body 40, the connector 363 of the substrate 361 may be exposed, and may be connected to a wire or the connector 363 at a side of the door body 40.

An end of the cover cutout 395 may be cut away from the connector 363 by a set distance. The connector 363 may be connected to the substrate 361 and exposed to the rear of the panel assembly 30, and has a disposition structure vulnerable to inflow of static electricity. Accordingly, the connector 363 may be spaced apart from the end of the cover cutout 395 made of metal by a set distance to prevent static electricity from being transferred to the connector 363. For example, the setting distance may be 20 mm.

The heat dissipation member cutout 822 may also have the same size as the cover cutout 395. In addition, the heat dissipation member cutout 822 may be formed such that an end of the heat dissipation member cutout 822 is spaced apart from the connector 363 by the set distance.

The cover fastening part 393 may be formed on the upper and lower portions of the back cover 39. The cover fastening part 393 is formed at a position corresponding to the screw hole 821 and the bracket fastening part 352*b*, and the screw 393*a* may be fastened thereto. Accordingly, the back cover 39 may be combined with the upper bracket 34 and the lower bracket 35 by fastening the screw 393*a*. The heat dissipation member 80 may be coupled to the back cover 39 in close contact.

A heat dissipation sheet 83 may be attached to the back cover 39. The heat dissipation sheet 83 may be formed of a thermally conductive material and may be formed in a sheet shape deformable along the curve of the back cover 39. For example, the heat dissipation sheet 83 may be formed of a graphite sheet. The heat dissipation sheet 83 may be attached to at least a front surface of the back cover 39 and may contact the rear surface of the heat dissipation member 80.

The heat dissipation sheet 83 may be formed in a shape corresponding to a lower shape of the back cover 39. The heat dissipation sheet 83 may extend from a left end to a right end of the back cover 39 and may extend upward from a lower end of the back cover 39. In this case, the heat dissipation sheet 83 may extend to a higher position than the heat dissipation member 80. The heat dissipation sheet 83 may extend to a position higher than the recessed top of the handle 457.

The heat dissipation sheet 83 may include a first heat dissipation sheet 83*a* and a second heat dissipation sheet 83*b* having the same size and shape. In addition, the first heat dissipation sheet 83*a* and the second heat dissipation sheet 83*b* may be provided on the front and rear surfaces of the back cover 39, respectively.

The first heat dissipation sheet 83a is attached to the front surface of the back cover 39 to transfer heat from the heat dissipation member 80 to a side of the back cover 39 more effectively. The second heat dissipation sheet 83b is attached to the rear surface of the back cover 39 and is exposed to the heat dissipation space 456 to more effectively achieve heat dissipation through the back cover 39.

The heat dissipation sheet 83 may be adhered to the back cover 39 and may be adhered to the heat dissipation member 80. To this end, an adhesive layer 831 may be formed on one surface of the heat dissipation sheet 83. An entire surface of the heat dissipation sheet 83 may be adhered to the back cover 39 by the adhesive layer 831.

The adhesive layer 831 may be formed on the other surface of the heat dissipation sheet 83, and a release paper 832 may be attached to the adhesive layer 831. In addition, only a region corresponding to an end of the heat dissipation sheet 83 of the release paper 832 may be removed.

An end of the first heat dissipation sheet 83a from which the release paper 832 is removed may be adhered to the heat dissipation member 80 based on the front surface of the back cover 39. That is, the first heat dissipation sheet 83a and the heat dissipation member 80 may be adhered to each other in a close contact state. In this case, the portion where the release paper 832 is removed is a portion to which the screw 393a is fastened, and at least a region in which the cover fastening part 393 of the back cover 39 is to be exposed may be removed.

In addition, the release paper 832 remains in contact with the light guide plate 33 except for the end portion of the heat dissipation sheet 83. Therefore, the light guide plate 33 and the heat dissipation sheet 83 may be in a simple contact state and not in a state of being adhered to each other.

The release paper 832 may be removed from an end of the second heat dissipation sheet 83b based on the rear surface of the back cover 39. The release paper 832 may be removed to expose the cover fastening part 393. The adhesive layer 831 exposed by removing the release paper 832 may be adhered to the top or bottom of the front surface of the door body 40.

In a state where the heat dissipation sheet 83 is attached to the back cover 39, the back cover 39 is coupled to complete assembly of the panel assembly 30.

Hereinafter, an assembly structure of the panel assembly 30 will be described with reference to drawings.

Figure 11:
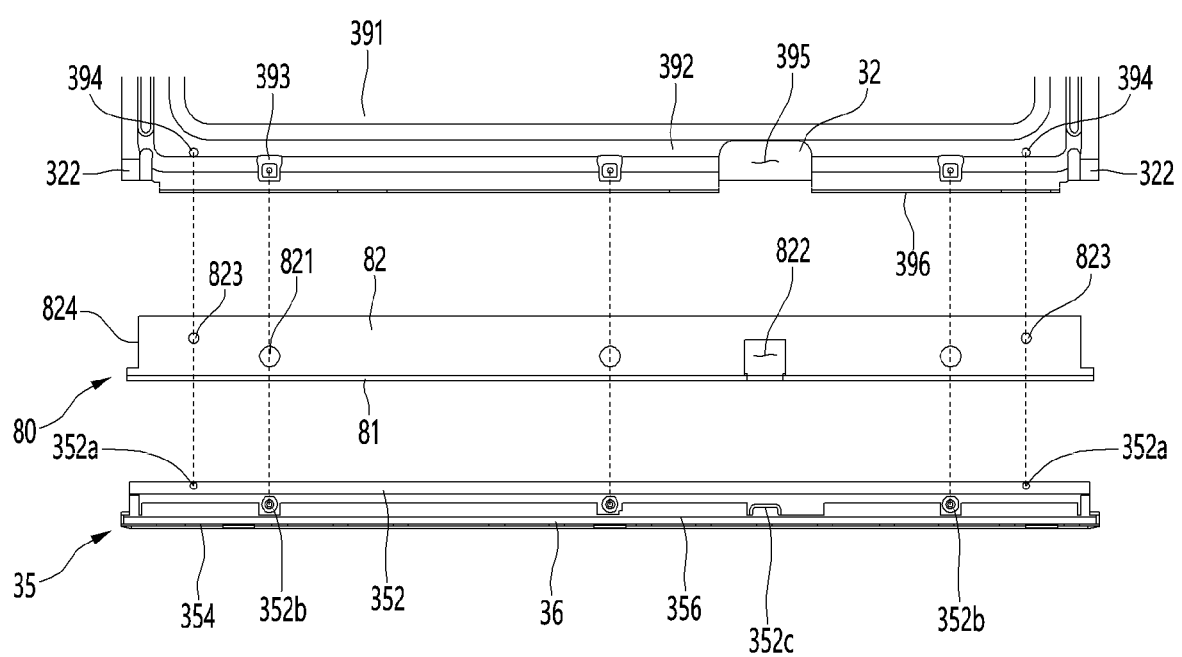
FIG. 11 is an exploded diagram showing a coupling structure, the back cover, the heat dissipation member, and the lower bracket.
Figure 12:
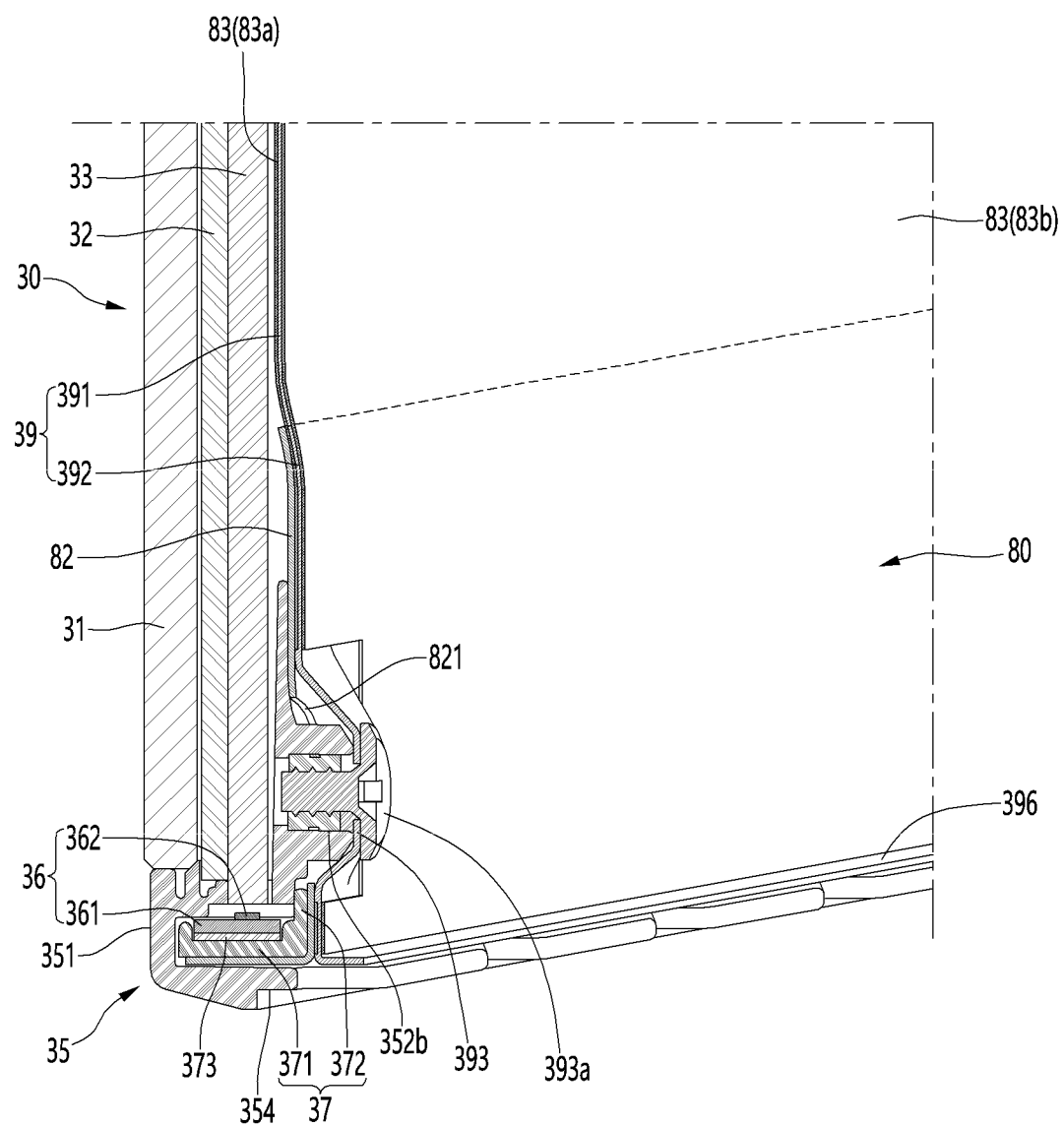
FIG. 12 is a perspective view taken along XII-XII' of FIG. 4.

FIG. 11 is an exploded diagram showing a coupling structure, the back cover, the heat dissipation member, and the lower bracket. FIG. 12 is a perspective view taken along XII-XII' of FIG. 4.

As shown in the drawings, the lower bracket 35 needs to be placed in an accurate position, and the solid coupling of the panel assembly 30 is completed only when the position of the lower bracket 35 is maintained, and the lighting device 36 in a normal position thereof may emit light to the panel 31.

To this end, the lower bracket 35 may be inserted into and fixed to the lower end of the mounting member 32. In this case, both sides of the lower bracket rear surface portion 352 may be inserted into and fixed to the side surface portion 322 of the mounting member 32.

The lighting device 36, the light supporter 37, and the heat dissipation member 80 may be inserted and mounted through the bracket opening 356. In this case, the lighting device 36 may be seated on the light supporter 37, and the light supporter 37 may be inserted into the bracket opening 356 in a state of being seated on the heat dissipation member 80.

At this time, the guide protrusions 352a of the lower bracket 35 may be inserted into the guide hole 823a. As the guide protrusions 352a on both left and right sides are inserted into the guide hole 823a at corresponding positions, the heat dissipation member 80 may be positioned on the lower bracket 35 in an accurate position.

Accordingly, in a state in which the guide protrusions 352a are inserted into the guide hole 823a, the bracket fastening part 352b may be exposed through the screw hole 821. In addition, the connector 363 of the substrate 361 may be aligned and exposed at positions corresponding to the bracket cutout 352c and the heat dissipation member cutout 822.

In this state, the back cover 39 may be disposed at the rear of the lower bracket 35. Left and right ends of the back cover 39 may be coupled to the side surface portion 322 of the mounting member 32. An upper end of the back cover 39 may be coupled to the upper bracket 34 by the screw, and a lower end of the back cover 39 may be coupled to the lower bracket 35 by the screw 393a.

At this time, the guide protrusions 352a of the lower bracket 35 may be arranged to pass through the cover guide hole 394 of the back cover 39. Accordingly, the back cover 39 may be aligned to be coupled to the lower bracket 35 in an accurate position. Through alignment of the back cover 39 and the lower bracket 35, the cover fastening part 393 is aligned with the bracket fastening part 352b and the screw hole 821 such that the screw 393a is easily fastened.

Both ends of the back cover 39 may be restrained by being coupled with the mounting member 32, and the lower part of the back cover 39 may be engaged with the lower bracket 35 and the heat dissipation member 80 in an aligned state. In a state in which the lower bracket 35 is mounted on the mounting member 32, the lower bracket 35 may maintain a state of being accurately coupled with other components. Therefore, each component included in the panel assembly 30 may be coupled at an accurate position without deviation as a whole, and a firm coupling between components may be ensured.

Through fastening of the screw 393a, the light supporter 37, the heat dissipation member 80, and the back cover 39 may be closely coupled to each other. In addition, the first heat dissipation sheet 83a attached to the front surface of the back cover 39 may be in close contact with the heat dissipation member 80, and the second heat dissipation sheet 83b attached to the rear surface of the back cover 39 may be exposed to the rear of the back cover 39.

Hereinafter, the operation and heat dissipation state of the lighting device 36 in the refrigerator 1 having the above structure will be described with reference to drawings.

Figure 13:
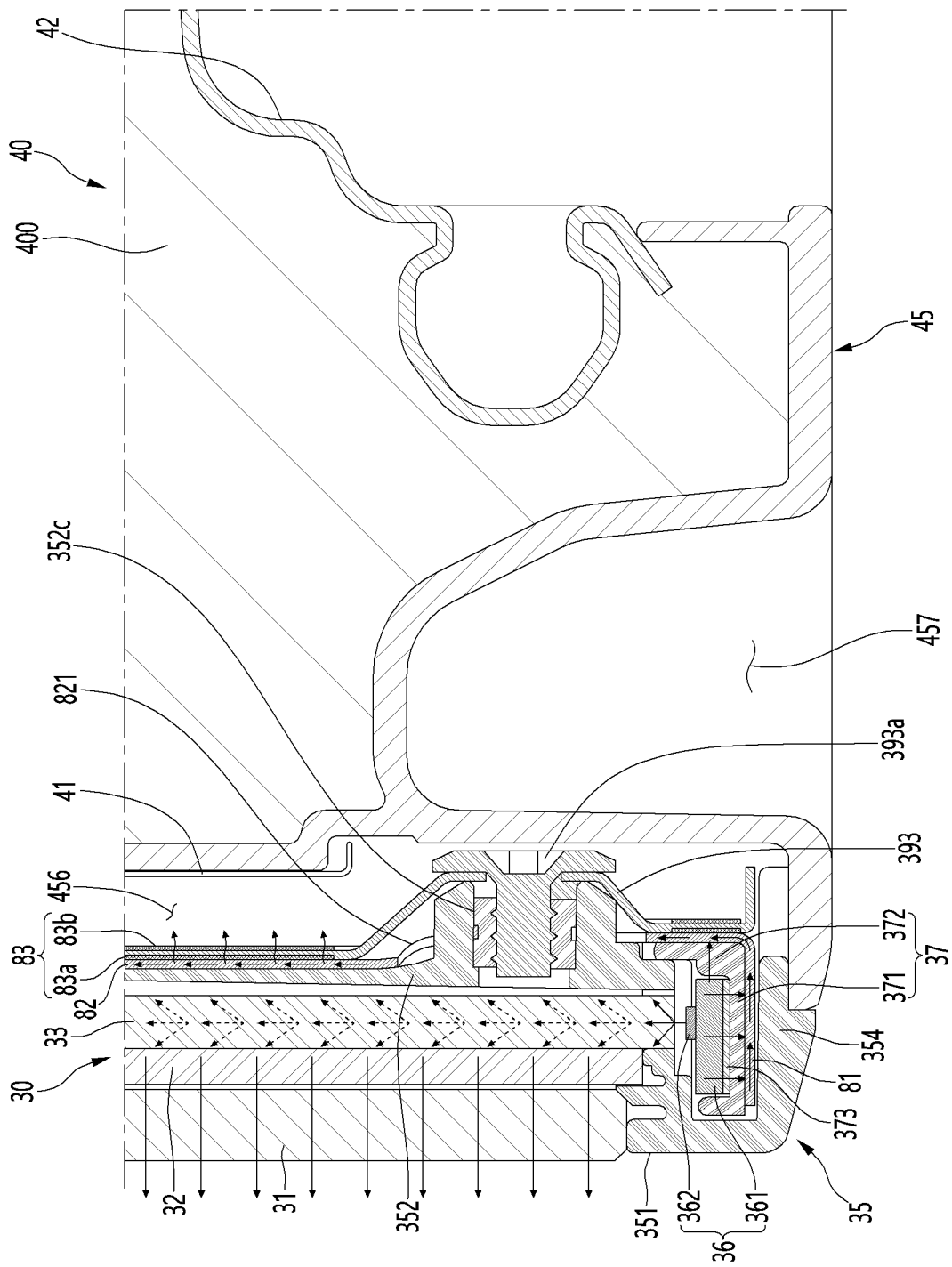
FIG. 13 is a cross-sectional view taken along XII-XII' of FIG. 3.
Figure 14:
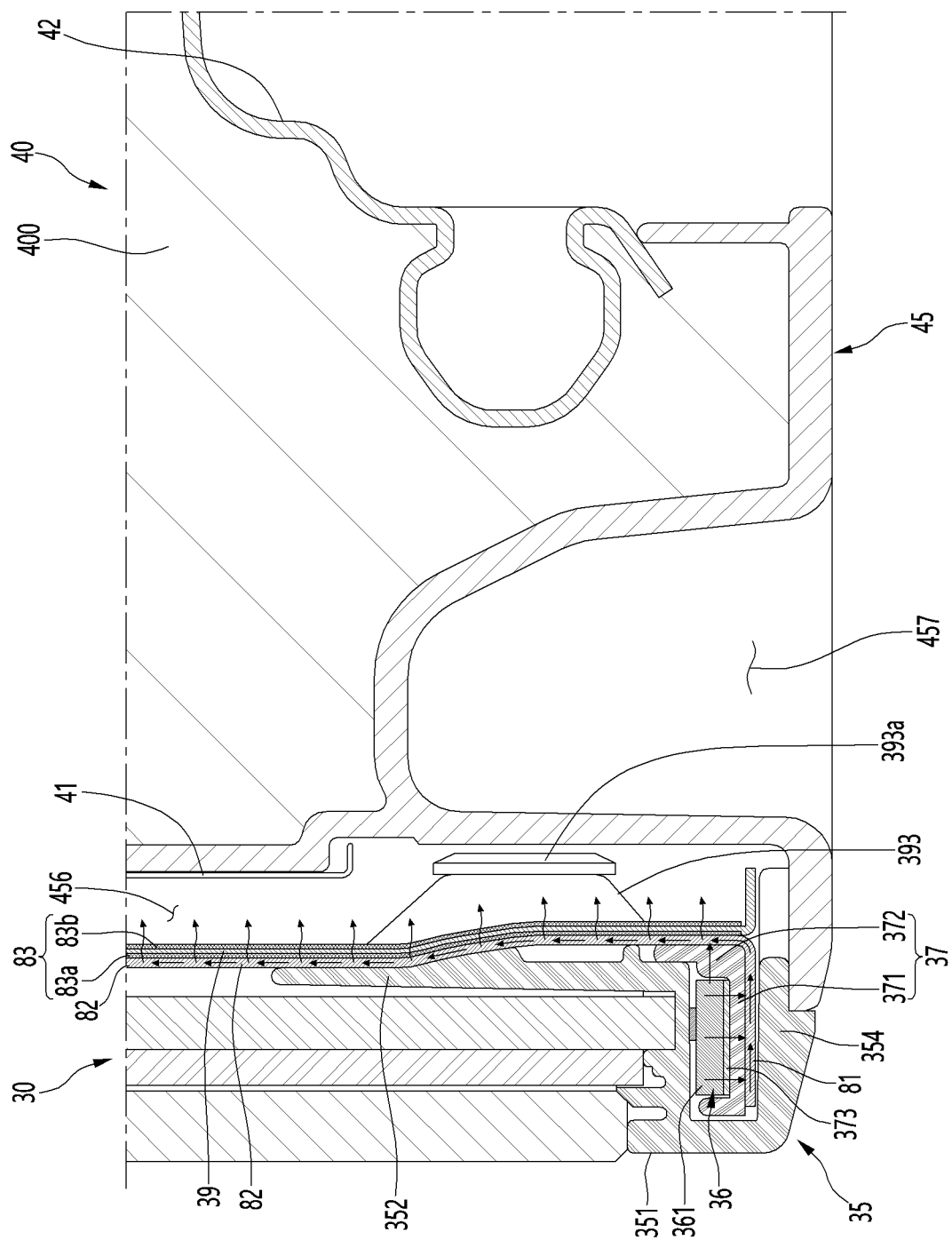
FIG. 14 is a cross-sectional view taken along XIV-XIV' of FIG. 3.

FIG. 13 is a cross-sectional view taken along XII-XII' of FIG. 3. FIG. 14 is a cross-sectional view taken along XIV-XIV' of FIG. 3.

As shown in the drawings, in a state in which the panel assembly 30 is mounted on the door body 40, when the lighting device 36 is turned on, the front surface of the door 20 may shine in the overall set color. An operation of the lighting device 36 may be controlled by manipulation of a user or a set program, and accordingly, the front color or output state of the door 20 may be changed such that the front appearance of the door 20 is expressed differently.

In detail, light emitted from the lighting device 36 may be emitted toward an end of the light guide plate 33. In addition, light moving along the light guide plate 33 may be reflected and emitted toward the panel 31, and the entire surface of the panel 31 may uniformly shine in a set color.

The door 20 may have frequent contact with a user for opening and closing operations. Static electricity may be generated during this process. Even if static electricity is generated when the door 20 and a hand of the user comes into contact, the lighting device 36 may be protected from static electricity.

In detail, the lighting device 36 may be supported by the light supporter 37 made of an electrical insulating material. Accordingly, the lighting device 36 is separated from the heat dissipation member 80 and the back cover 39 which are made of metal by the light supporter 37. Even if the static electricity flowing into the door 20 penetrates into the back cover 39 and the heat dissipation member 80, the lighting device 36 is electrically insulated by the light supporter 37, and thus static electricity is not transmitted. Therefore, the lighting device 36 may be prevented from being damaged by static electricity.

In a state in which the lighting device 36 is turned on, the lighting device 36 generates heat. In particular, in order to maintain the appearance of the front of the door 20, the lighting device 36 may remain turned on for a long time, and heat generated at this time may be dissipated to the rear of the panel assembly 30.

In detail, heat generated in the lighting device 36 may be transferred to the light supporter 37. At this time, the light supporter 37 maintains contact with the lighting device 36. Since the light supporter 37 is formed of a material having higher heat conduction performance than the lower bracket 35, heat of the lighting device 36 may be mainly transferred to a side of the light supporter 37 rather than the lower bracket 35.

Since the light supporter 37 is in contact with the heat dissipation member 80 made of a metal material, heat from the light supporter 37 is transferred to the heat dissipation member 80. The heat conducted to the heat dissipation member 80 may move upward along the heat dissipation member 80. In this case, the heat dissipation member 80 may extend upward beyond a position of the handle 457. Accordingly, the heat dissipation member 80 may transfer heat to a position higher than that of the handle 457.

Heat conducted by the heat dissipation member 80 may be dissipated to the heat dissipation space 456 through the back cover 39. In this case, the heat dissipation sheet 83 may be attached to the back cover 39. That is, the heat dissipation sheet 83 may be in contact with the heat dissipation member 80, and the heat of the heat dissipation member 80 may be transferred to the back cover 39 via the heat dissipation sheet 83.

The heat dissipation sheet 83 extends upward more than the heat dissipation member and may have a larger area than the heat dissipation member 80. Accordingly, the heat transferred to the heat dissipation sheet 83 may be transferred to the back cover 39 over as large an area as possible.

The heat dissipation sheet 83 may be provided on both the front and rear surfaces of the back cover 39, and when the second heat dissipation sheet 83b is provided on the rear surface of the back cover 39, heat of the back cover 39 may be dissipated into the heat dissipation space 456 through the second heat dissipation sheet 83b.

That is, heat generated from the lighting device 36 moves to the back cover 39 while being conducted along the light supporter 37, the heat dissipation member 80, the heat dissipation sheet 83, and the back cover 39 made of a material having a higher thermal conductivity than the lower bracket 35. The back cover 39 is exposed to the heat dissipation space 456 and may emit heat to the heat dissipation space 456. In addition, heat dissipated into the heat dissipation space 456 may be dissipated by convection and discharged to the outside.

Therefore, even if the lighting device 36 is in an on state for a long time and continuously generates heat, heat generated from the lighting device 36 may be conducted along the light supporter 37, the heat dissipation member 80, the heat dissipation sheet 83, and the back cover 39 and transferred to the rear surface of the panel assembly 30. In addition, heat induced to the rear surface of the panel assembly 30 may be dissipated to the heat dissipation space 456. Due to this heat dissipation, the lighting device 36 may not overheat and may maintain an appropriate temperature, and thus damage or durability degradation due to high temperature may be prevented.

In addition, heat of the lighting device 36 is guided to the rear of the door, thereby minimizing a temperature rise of the front surface of the door 20. Accordingly, even if the user approaches or touches the front surface of the panel 31, that is, the door 20, it is possible not to feel discomfort due to high temperature. In addition, heat from the lighting device 36 may be induced upward from the handle 457 by the heat dissipation member 80, the heat dissipation sheet 83, and the back cover 39 to be dissipated. Therefore, direct heat conduction to the handle 457 is not performed, and thus a temperature increase at the side of the handle 457 may be prevented. Therefore, even if the user grabs the handle 457 located at the end of the door 20, it is possible not to feel discomfort due to high temperature.

Various other embodiments of the present disclosure may be possible in addition to the above-described embodiments. According to a second embodiment of the present disclosure, a light supporter structure in which a space is formed in front of the lighting device is provided. The second embodiment of the present disclosure has the same structure as the previous embodiment except for the light supporter, and the same reference numerals are used for the same components, and detailed description thereof will be omitted. In addition, reference numerals not described or reference numerals not shown are the same as the same reference numerals in the above-described embodiment, and descriptions thereof will be omitted.

Hereinafter, a second embodiment of the present disclosure will be described with reference to the drawings.

Figure 15:
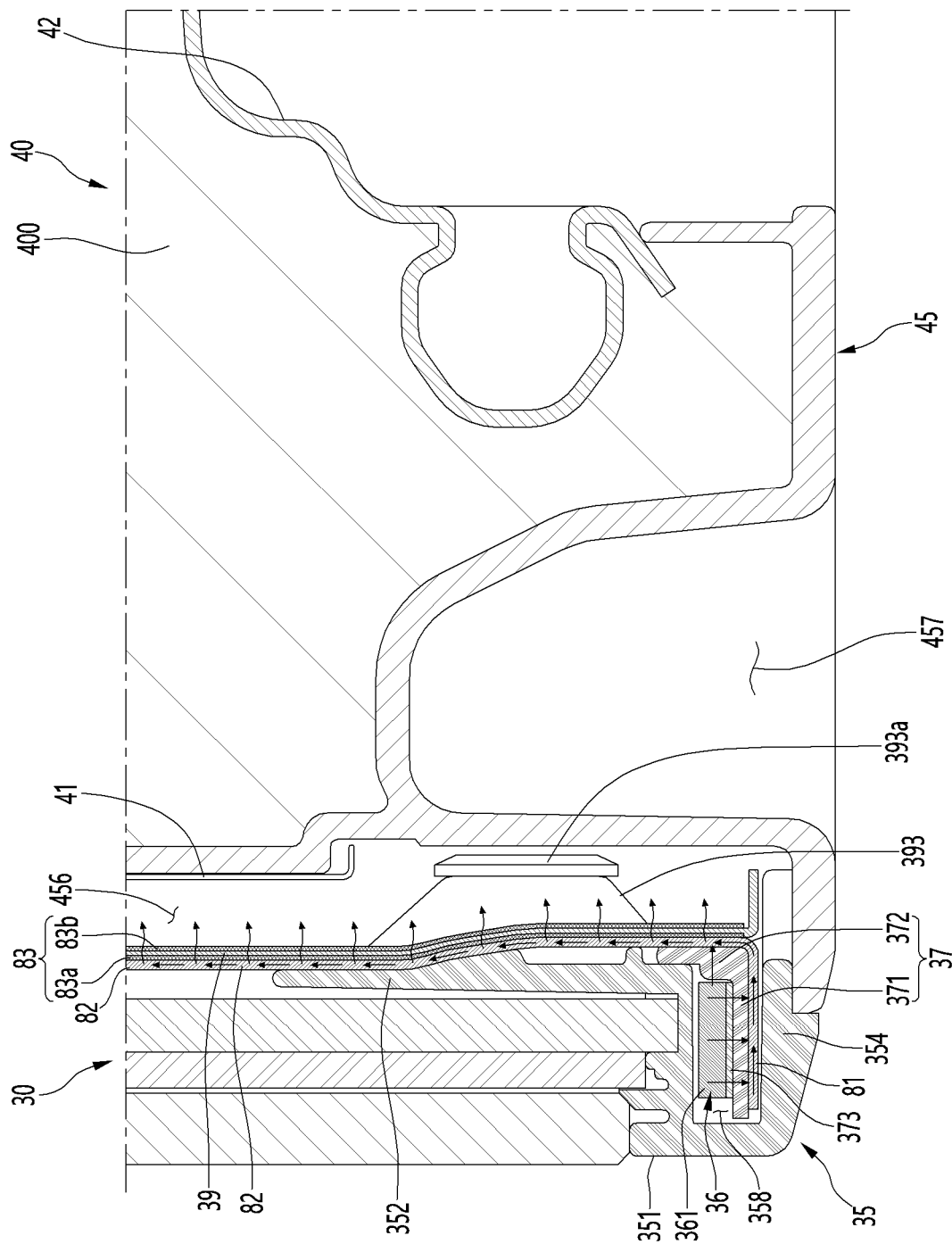
FIG. 15 is a cross-sectional view of a lower part of the panel assembly according to the second embodiment of the present disclosure.

FIG. 15 is a cross-sectional view of a lower part of the panel assembly according to the second embodiment of the present disclosure.

As shown in the drawing, the panel assembly 30 of the refrigerator 1 according to the second embodiment of the present disclosure may include the panel 31, the lighting device 36, the light supporter 37, and the upper bracket 34, the lower bracket 35, the heat dissipation member 80, and the back cover 39 as in the previous embodiment.

The panel assembly 30 may further include the light guide plate 33. The panel assembly 30 may further include the mounting member 32. In addition, the panel assembly 30 may further include the heat dissipation sheet 83.

The light supporter 37 may be disposed inside the lower bracket 35 and may support the lighting device 36 from below. The light supporter 37 may be formed of the same material as in the above-described embodiment. That is, the light supporter 37 may be formed of a material having electrical insulation and thermal conductivity.

The light supporter 37 may include the seating portion 371 on which the lighting device 36 is seated and the contact portion 372 in contact with the heat dissipation member 80.

The lighting device 36 may be attached to the seating portion 371 by the adhesive member 373.

The seating portion 371 extends forward from the lower end of the contact portion 372, and may extend more forward than the substrate 361 of the lighting device 36. The front end of the seating portion 371 may extend to contact the inner surface of the lower bracket 35. In a state in which the lighting device 36 is mounted on the seating portion 371, the seating portion 371 may protrude forward more than the lighting device 36. Accordingly, when the lighting device 36 and the light supporter 37 are mounted inside the lower bracket 35, a space 358 may be formed in front of the lighting device 36.

In this structure, when the lighting device 36 is turned on, the lighting device 36 generates heat, and the heat of the lighting device 36 is conducted along the light supporter 37, the heat dissipation member 80, the heat dissipation sheet 83, and the back cover 39 and may be dissipated in the heat dissipation space 456.

Heat generated from the lighting device 36 may not be conducted to the front surface of the door 20, that is, the lower bracket front surface portion 351 by the space 358. Therefore, it is possible to prevent a temperature rise of the front surface of the door 20, that is, the front surface of the panel assembly 30.

Heat generated from the lighting device 36 may be induced toward the contact portion 372 having thermal conductivity. The heat transferred to the light supporter 37 may be transferred to the heat dissipation member 80 and the back cover 39 contacting the contact portion 372 and then dissipated in the heat dissipation space 456.

Various other embodiments of the present disclosure may be possible in addition to the above-described embodiments. According to a third embodiment of the present disclosure, a portion of the rear surface of the back cover is cut to minimize placement of an electrically conductive structure adjacent to the lighting device. The third embodiment of the present disclosure has the same structure as the previous embodiment except for the back cover, and the same reference numerals are used for the same components, and detailed description thereof will be omitted. In addition, reference numerals not described or reference numerals not shown are the same as the same reference numerals in the above-described embodiment, and descriptions thereof will be omitted.

Hereinafter, a third embodiment of the present disclosure will be described with reference to the drawings.

Figure 16:
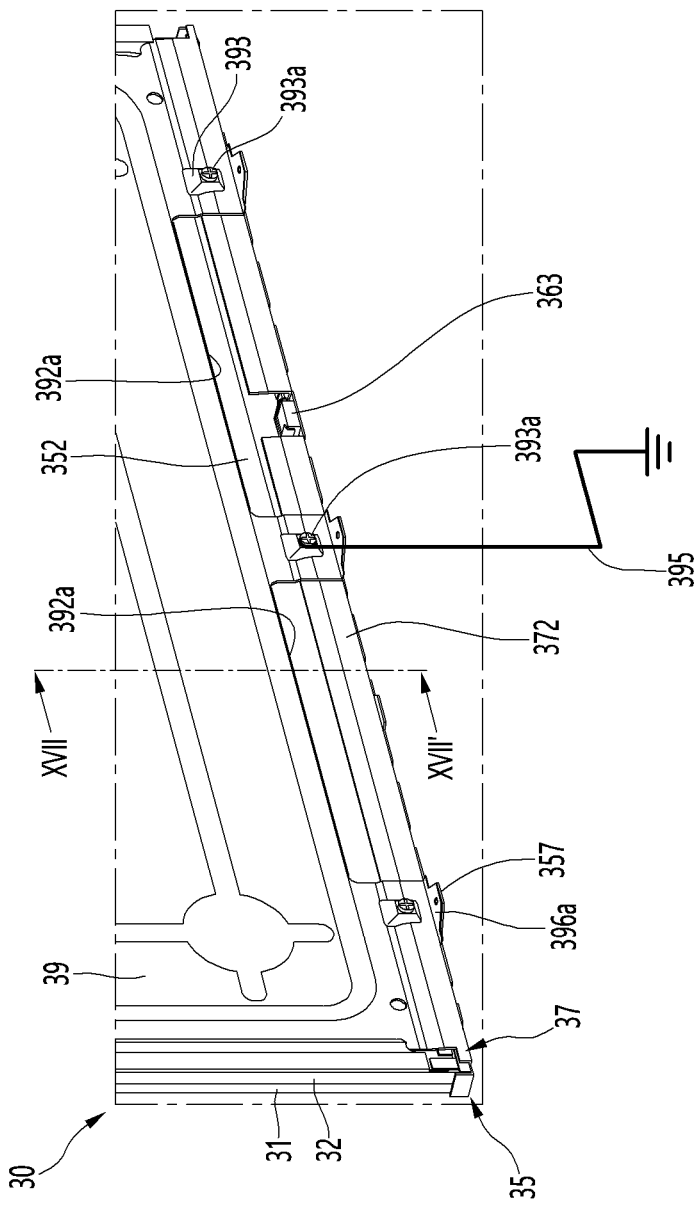
FIG. 16 is a lower perspective view of a panel assembly according to a third embodiment of the present disclosure.

FIG. 16 is a lower perspective view of a panel assembly according to a third embodiment of the present disclosure. FIG. 17 is a cross-sectional view taken along XVII-XVII' of FIG. 16.

As shown in the drawing, the panel assembly 30 of the refrigerator 1 according to the third embodiment of the present disclosure includes the panel 31, the lighting device 36, the light supporter 37, and the upper bracket 34, the lower bracket 35, and the back cover 39.

The panel assembly 30 may further include the light guide plate 33. The panel assembly 30 may further include the mounting member 32. In addition, the panel assembly 30 may further include the heat dissipation sheet 83.

The light supporter 37 is disposed inside the lower bracket 35 and may support the lighting device 36 from below. The light supporter 37 may be formed of the same material as in the above-described embodiment. That is, the light supporter 37 may be formed of a material having electrical insulation and thermal conductivity.

The light supporter 37 may include the seating portion 371 on which the lighting device 36 is seated and the contact portion 372 in contact with the back cover 39. The lighting device 36 may be attached to the seating portion 371 by the adhesive member 373.

A top surface of the seating portion 371 may come into contact with the substrate 361, and a bottom surface of the seating portion 371 may come into contact with a bottom surface of the lower bracket 35. That is, the seating portion 371 may be positioned between the substrate 361 and the lower bracket 35. The contact portion 372 is exposed through the bracket opening 356 and comes into contact with the back cover 39 when the back cover 39 is mounted. The contact portion 372 may shield the bracket opening 356.

The screw 393*a* for coupling the back cover 39 may be fastened to the back cover 39. A ground line 395 for inducing static electricity transmitted to the door 20 to the outside may be connected to the screw 393*a*. Needless to say, the ground wire 395 is connected to the other side of the back cover 39 instead of the screw 393*a* and thus static electricity transmitted through the back cover 39 is not directed to the lighting device 36 but is guided to the outside of the door.

A cutout 392*a* may be formed at the lower end of the back cover 39. A plurality of cutouts 392*a* may be continuously formed along the lower end of the back cover 39. The cutout 392*a* may extend upward from the lower end of the back cover 39. In this case, the upper end of the cutout 392*a* may be located above the lighting device 36 by a set distance D3. In this case, the set distance D3 may be a distance at which static electricity flowing along the back cover 39 is not transferred to the lighting device 36. For example, the set distance D3 may be about 20 mm. As another example, the set distance D3 may be a distance between an upper end of the bracket opening 356 and an upper end of the cover perimeter portion 392.

In addition, the cutout 392*a* may be formed such that all of the lower portion of the back cover 39 except for the portion in which the cover fastening part 393 is formed is removed. Therefore, the back cover 39 may come into contact with the lower bracket 35 and the light supporter 37 only at a minimal portion except for a portion for actual coupling.

Accordingly, heat generated when the lighting device 36 is driven may be sequentially conducted to the light supporter 37 and the back cover 39, and may be dissipated through the heat dissipation space 456. In addition, the heat dissipation sheet 83 is attached to the back cover 39 such that heat conduction and heat dissipation through the back cover 39 are performed more effectively.

Even if static electricity is generated in the door 20, static electricity may be induced to the outside of the door 20 through the ground wire 395 of the back cover 39 without going to the lighting device 36. In addition, the back cover 39 is sufficiently spaced from the lighting device 36 by the cutout 392*a*, and static electricity is prevented from being transferred to the lighting device 36 by the light supporter 37 having electrical insulation.

What is claimed is:

1. A refrigerator comprising:
a cabinet defining a storage space; and
a door including a door body configured to open and close the storage space and a panel assembly coupled to the door body,
wherein the panel assembly includes:
a panel defining a front surface of the door and configured to transmit light therethrough, a back cover defining a rear surface of the panel assembly and made of a metal material, a lighting device configured to emit light to the panel, and a light supporter made of an electrical insulation material and configured to accommodate the lighting device, and wherein the back cover is configured to dissipate heat generated by the lighting device to a rear of the panel assembly.

2. The refrigerator of claim 1, wherein the light supporter is made of a plastic material having thermal conductivity.

3. The refrigerator of claim 2, wherein the light supporter is made of any one of a material in which a thermally conductive filler and a glass fiber (GF) are added to polyamide 6 (PA6), a material in which a mineral fiber (MF) is added to polyphenylene sulfide (PPS), a material in which carbon nanotubes (CNT) are added to polycarbonate (PC), and a material in which a mineral fiber (MF) and a glass fiber (GF) are added to polyamide 6 (PA6) or polyamide 66 (PA66).

4. The refrigerator of claim 2, further comprising:

a heat dissipation member in contact with the light supporter and the back cover, made of a thermally conductive material and configured to transfer the heat generated during the operation of the lighting device to the back cover.

5. The refrigerator of claim 4, wherein the light supporter is disposed between the lighting device and the heat dissipation member and separates the lighting device and the heat dissipation member from each other.

6. The refrigerator of claim 1, wherein the panel assembly further includes a bracket defining a top surface or a bottom surface of the panel assembly, and wherein the lighting device is provided at the bracket.

7. The refrigerator of claim 6, further comprising:

a bracket opening defined at a rear surface of the bracket and configured to pass the lighting device and light supporter, wherein the bracket opening is shielded by a heat dissipation member.

8. The refrigerator of claim 7, wherein the lighting device includes a plurality of light emitting diodes (LEDs) that are continuously disposed along a substrate, and wherein the light supporter includes:

a seating portion configured to accommodate the substrate, and a contact portion extending from the seating portion and exposed through the bracket opening.

9. The refrigerator of claim 8, wherein the substrate is in contact with the seating portion by an adhesive member, and the adhesive member includes a thermally conductive material.

10. The refrigerator of claim 8, wherein the seating portion is recessed and defines an accommodating groove configured to accommodate the substrate.

11. The refrigerator of claim 8, wherein the contact portion extends parallel to the back cover and is in surface contact with the heat dissipation member.

12. The refrigerator of claim 8, wherein the heat dissipation member includes:

a first part disposed between the seating portion and an inner surface of the bracket, the first part in contact with the seating portion; and a second part extending from the first part and configured to cover the bracket opening, wherein a front surface of the second part is in contact with the contact portion and a rear surface of the second part is in contact with the back cover.

13. The refrigerator of claim 12, wherein the first part is configured to be inserted through a decoration opening and extend between the seating portion and the bracket.

14. The refrigerator of claim 12, wherein the panel assembly further includes a light guide plate disposed behind the panel and configured to guide light emitted from the lighting device to the panel, wherein the back cover includes:

a cover protrusion protruding forward and configured to support the light guide plate, and a cover perimeter disposed along a perimeter of the cover protrusion and including a stepped portion protruding forward, and wherein the second part extends toward the cover perimeter.

15. The refrigerator of claim 12, wherein a handle is recessed at a side of the door and the second part extends beyond a recessed end of the handle.

16. The refrigerator of claim 12, wherein a heat dissipation sheet made of a thermally conductive material is disposed between the contact portion and the back cover, and wherein the heat dissipation sheet further extends upward from a lower end of the back cover and past an upper end of the contact portion.

17. The refrigerator of claim 16, wherein the heat dissipation sheet includes:

a first heat dissipation sheet in contact with a front surface of the back cover and the contact portion; and a second heat dissipation sheet in contact with a rear surface of the back cover and exposed to a space between a front surface of the door body and the back cover.

18. The refrigerator of claim 2, wherein the light supporter is in contact with the back cover.

19. The refrigerator of claim 1, wherein a heat dissipation space is defined between the back cover and a front surface of the door body.

20. The refrigerator of claim 1, wherein the door body includes:

a body plate defining a front surface of the door body and disposed to face the back cover and be spaced apart from the back cover;

a door liner defining a rear surface of the door;

an upper cap decoration defining an upper surface of the door body;

a lower cap decoration defining a bottom surface of the door body; and an insulator made of a foaming liquid injected into a space defined by coupling the body plate, the door liner, the upper cap decoration, and the lower cap decoration.

* * * * *